(12) United States Patent
Jones et al.

(10) Patent No.: US 7,024,331 B2
(45) Date of Patent: Apr. 4, 2006

(54) TAG TRACKING

(75) Inventors: Aled Wynne Jones, Harston (GB); Paul Anthony Smith, Harston (GB); Paul Joseph Bearpark, Waterbeach (GB); Michael Raymond Reynolds, Royston (GB); Daniel Reginald Ewart Timson, Harston (GB); Andrew Michael Rhodes, Harston (GB); Nicolas Vasilopoulos, Athens (GR); Peter Duffet-Smith, Cottenham (GB); David Bartlett, St. Ives (GB)

(73) Assignee: Scientific Generics Limited, Cambridgeshire (GB)

( * ) Notice: Subject to any disclaimer, the term of this patent is extended or adjusted under 35 U.S.C. 154(b) by 96 days.

(21) Appl. No.: 10/777,127

(22) Filed: Feb. 13, 2004

(65) Prior Publication Data

US 2004/0260506 A1    Dec. 23, 2004

Related U.S. Application Data

(63) Continuation-in-part of application No. 10/416,804, filed as application No. PCT/GB01/05029 on Nov. 14, 2001.

(30) Foreign Application Priority Data

| Nov. 15, 2000 | (GB) | ................................ 0027886 |
| Nov. 15, 2000 | (GB) | ................................ 0027888 |
| Aug. 14, 2001 | (GB) | ................................ 0119787 |
| Mar. 20, 2002 | (GB) | ................................ 0206597 |
| Apr. 29, 2002 | (GB) | ................................ 0209781 |

(51) Int. Cl.
*G06F 15/00* (2006.01)

(52) U.S. Cl. ..................................... 702/150; 701/300

(58) Field of Classification Search ................ 701/300; 702/150; G01S 3/86
See application file for complete search history.

(56) References Cited

U.S. PATENT DOCUMENTS 3,546,696 A    12/1970    Waters et al.

(Continued)

FOREIGN PATENT DOCUMENTS

GB    2 267 623 A    12/1993

(Continued)

OTHER PUBLICATIONS

Werb et al.; "Designing A Positioning System For Finding Things And People Indoors"; The Practical Engineer, IEEE Spectrum, vol. 35, No. 9, pp. 71-78, (1998).

*Primary Examiner*—Michael Nghiem
*Assistant Examiner*—Douglas N. Washburn
(74) *Attorney, Agent, or Firm*—Finnegan, Henderson, Farabow, Garrett & Dunner, L.L.P.

(57) ABSTRACT

A position determining system in which a mobile tag having an unknown position is tracked in space over time. In use, the mobile tag either transmits or receives signals including a pair of tones at different frequencies from a number of base stations having known locations. The phase of each of the received signals is then measured and the measured phases are then passed to a processing unit which determines the position of the tag at the time of the transmission of the signals on the basis of the difference between the measured phases of the two tones. In one embodiment, this system is combined with a conventional phase-based position measurement which is derived from phase measurements of similar tones transmitted between the mobile tag and different base stations.

23 Claims, 21 Drawing Sheets

U.S. PATENT DOCUMENTS

| | | |
|---|---|---|
| 3,680,121 A | 7/1972 | Anderson et al. |
| 3,696,427 A | 10/1972 | Nard |
| 3,714,573 A | 1/1973 | Grossman |
| 3,747,106 A | 7/1973 | Dalabakis et al. |
| 3,774,215 A | 11/1973 | Reed |
| 3,889,264 A | 6/1975 | Fletcher |
| 4,283,726 A | 8/1981 | Spence et al. |
| 4,740,792 A | 4/1988 | Sagey et al. |
| 4,884,208 A | 11/1989 | Marinelli et al. |
| 4,916,455 A | 4/1990 | Bent et al. |
| 5,045,861 A | 9/1991 | Duffett-Smith |
| 5,063,560 A | 11/1991 | Yerbury et al. |
| 5,335,246 A | 8/1994 | Yokev et al. |
| 5,365,516 A | 11/1994 | Jandrell |
| 5,379,047 A | 1/1995 | Yokev et al. |
| 5,430,759 A | 7/1995 | Yokev et al. |
| 5,438,518 A | 8/1995 | Bianco et al. |
| 5,499,266 A | 3/1996 | Yokev et al. |
| 5,513,854 A | 5/1996 | Daver |
| 5,519,718 A | 5/1996 | Yokev et al. |
| 5,530,452 A | 6/1996 | Yokev et al. |
| 5,546,422 A | 8/1996 | Yokev et al. |
| 5,583,517 A | 12/1996 | Yokev et al. |
| 5,592,180 A | 1/1997 | Yokev et al. |
| 5,596,330 A | 1/1997 | Yokev et al. |
| 5,712,867 A | 1/1998 | Yokev et al. |
| 5,838,279 A | 11/1998 | Duffett-Smith et al. |
| 5,883,598 A | 3/1999 | Parl et al. |
| 5,960,355 A | 9/1999 | Ekman et al. |
| 6,004,211 A | 12/1999 | Brenner et al. |
| 6,009,138 A | 12/1999 | Slusky |
| 6,066,967 A | 5/2000 | Cahill et al. |
| 6,100,806 A | 8/2000 | Gaukel |
| 6,121,926 A | 9/2000 | Belcher et al. |
| 6,170,748 B1 | 1/2001 | Hash et al. |
| 6,268,723 B1 | 7/2001 | Hash et al. |
| 6,504,483 B1 | 1/2003 | Richards et al. |
| 6,542,114 B1 * | 4/2003 | Eagleson et al. ...... 342/357.07 |
| 6,720,888 B1 * | 4/2004 | Eagleson et al. ........... 340/905 |
| 6,868,073 B1 * | 3/2005 | Carrender .................. 370/278 |

FOREIGN PATENT DOCUMENTS

| | | |
|---|---|---|
| GB | 2 298 098 A | 8/1996 |
| JP | 58-129277 | 8/1983 |
| JP | 61-168982 | 7/1986 |
| JP | 62-119476 | 5/1987 |
| JP | 9-34959 | 2/1997 |
| WO | 87/04883 | 8/1987 |
| WO | 91/03892 | 3/1991 |
| WO | 95/14935 | 6/1995 |
| WO | 95/14936 | 6/1995 |
| WO | 95/15064 | 6/1995 |
| WO | WO 96/16700 | 6/1996 |
| WO | 96/25673 | 8/1996 |
| WO | 96/27822 | 9/1996 |
| WO | WO 97/02699 | 1/1997 |
| WO | 97/11384 | 3/1997 |
| WO | 97/23785 | 7/1997 |
| WO | 97/30360 | 8/1997 |
| WO | 98/01768 | 1/1998 |
| WO | 98/37932 | 9/1998 |
| WO | 99/11086 | 3/1999 |
| WO | 99/21028 | 4/1999 |
| WO | 99/30181 | 6/1999 |
| WO | 99/34230 | 7/1999 |
| WO | 99/53339 | 10/1999 |
| WO | 00/14561 | 3/2000 |
| WO | 00/48016 | 8/2000 |
| WO | 01/07928 A1 | 2/2001 |
| WO | 01/34264 A1 | 5/2001 |
| WO | 01/53852 A1 | 7/2001 |
| WO | 01/61465 A1 | 8/2001 |

* cited by examiner

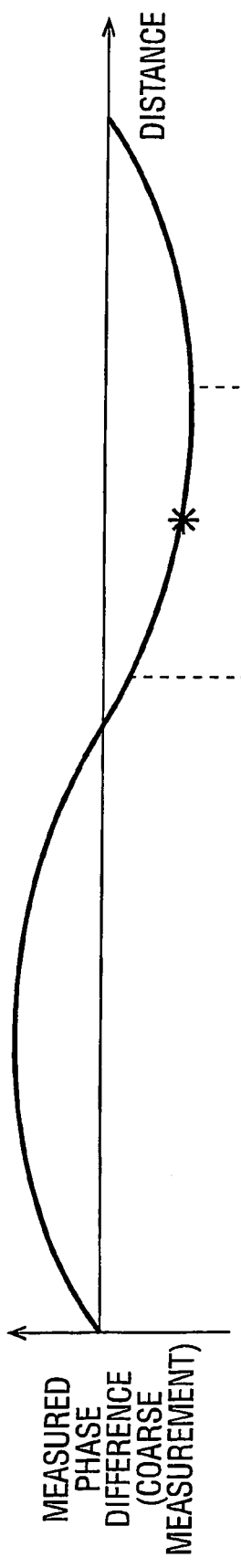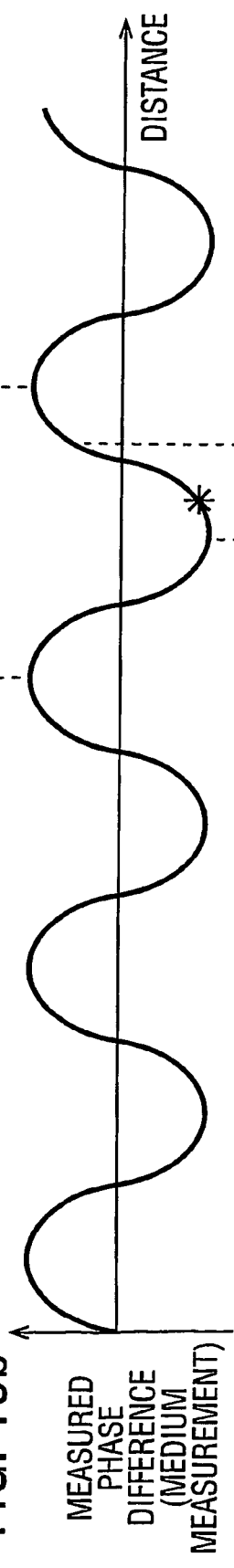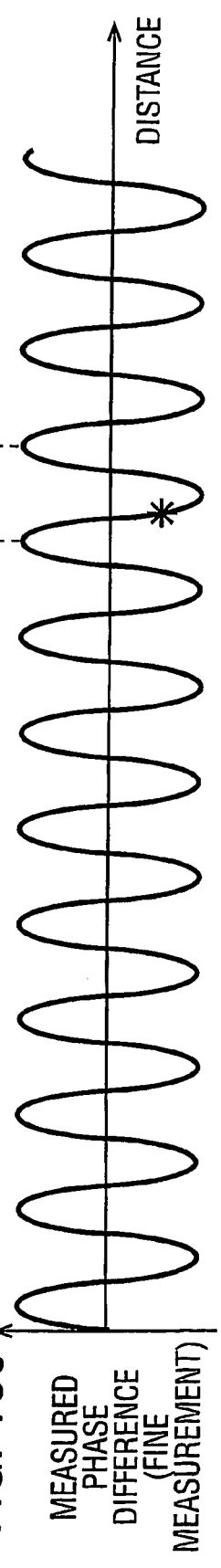
FIG. 16a  MEASURED PHASE DIFFERENCE (COARSE MEASUREMENT)
FIG. 16b  MEASURED PHASE DIFFERENCE (MEDIUM MEASUREMENT)
FIG. 16c  MEASURED PHASE DIFFERENCE (FINE MEASUREMENT)

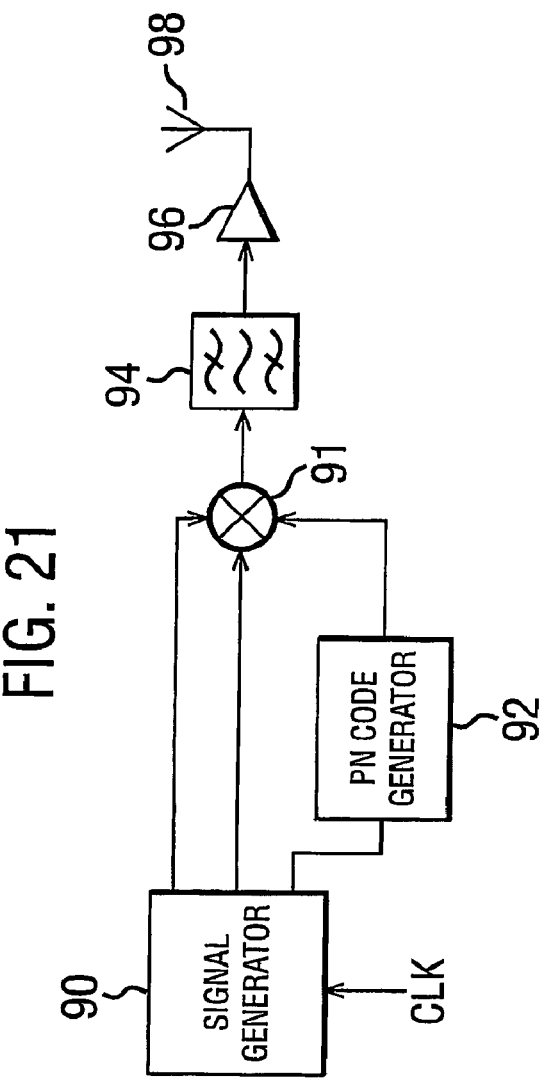
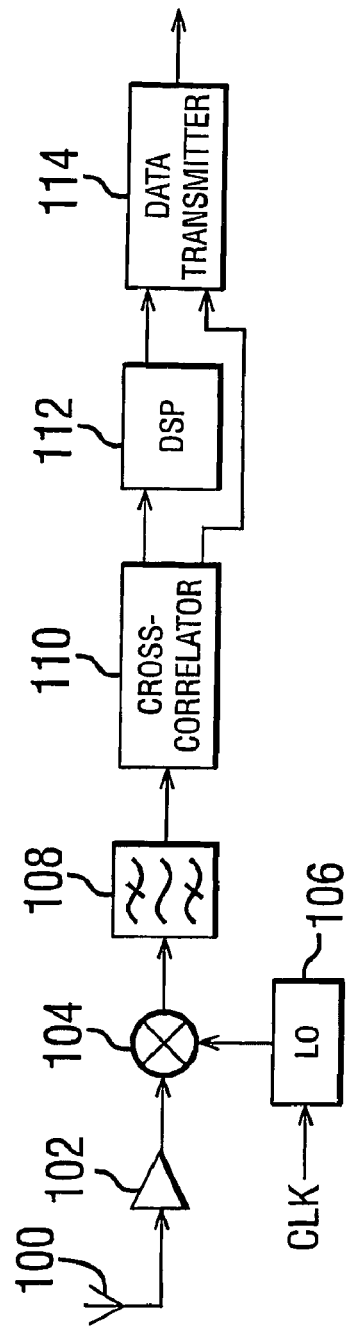

TAG TRACKING

CROSS REFERENCE TO RELATED APPLICATIONS

This application is a Continuation-In-part of U.S. application Ser. No. 10/416,804, filed Oct. 23, 2003, the content of which is incorporated herein by reference, which is a National Phase Application of PCT/GB01/05029, filed Nov. 14, 2001, and claims the priority of Great Britain Patent Application Nos. 0027886.1, filed Nov. 15, 2000, 0027888.7, filed Nov. 15, 2000, and 01 19787.0, filed Aug. 14, 2001, and claims the benefit of International Application No. PCT/GB02/02245, filed May 14, 2002, which claims the benefit of Great Britain Application Nos. 01 19787.0, filed Aug. 14, 2001, 0206597.7, filed Mar. 20, 2002, and 0209781.4, filed Apr. 29, 2002, the content of all of which is incorporated herein by reference.

This invention relates to a method and apparatus for tracking moving objects. The invention has particular but not exclusive relevance to the tracking of competitors of a race using electronic tags which are carried by the competitors and which transmit signals that are detected by a tracking system.

There is a requirement for a system to track the movement of competitors in a race or similar sporting event to provide movement data for use in race reconstruction and simulation services. Sporting events of interest include for example, horse racing, dog racing, motor racing, golf etc. Such a tracking system requires any device to be carried on or by the competitors in the racing event to be as small and light and unobtrusive as possible so as not to impede the competitors in the race or event. Also, in order to reduce costs and operating difficulties, any RF signals used by the system would preferably be within a frequency band in which no licence is required and in a band in which transmission is permitted. Further, the position accuracy should be sufficient that the data generated accurately describes the position of the competitors relative to one another. The tracking range of the system must also be able to cover the size of the venue at which the racing event is to take place.

U.S. Pat. No. 5,045,861 describes a mobile receiver which is mounted in, for example, a motor vehicle, and which is operable to receive signals transmitted from a number of fixed transmitter stations. These received signals are then transmitted to a fixed receiver which also receives the signals from the transmitter stations. The signals transmitted by the transmitter stations are single tone signals and the fixed receiver calculates the position of the mobile receiver from the difference in phase between the signals received from the mobile receiver and the signals received directly from the fixed transmitter stations.

The system described in U.S. '861 has a number of practical problems which make it unsuitable for use in a system for tracking the movement of competitors in a race or similar sporting event. One of the main problems is that when a single tone is transmitted between the transmitter and the mobile receiver, the distance between the two must be less than the wavelength of the transmitted tone if an absolute position measurement is to be determined. If this is not the case, then a phase ambiguity problem arises. In an application such as horse racing or dog racing, the measurement range may need to be between a few hundred metres and a few kilometres. This requires a transmission frequency in the kilohertz or megahertz part of the radio spectrum. However, use of this part of the radio spectrum is highly regulated making it impractical to use these frequencies.

One solution to this problem is to use a higher frequency and to track the position of the mobile receiver as it moves from one wavelength of the transmitted tone to the next. However, this requires the absolute position of the mobile receiver to be known at some initial starting point. Another alternative is to lower the frequency of the transmitted tones, however this reduces the resolution of the position measurement making it difficult to distinguish between the different competitors of the race.

The present invention aims to provide an alternative system for tracking objects using phase measurements which at least alleviates one or more of these problems.

According to one aspect, the present invention provides a position determining system comprising:

a tag and a plurality of base stations, wherein the tag and the plurality of base stations are arranged so that upon the transmission of a signal comprising first and second frequency components having a frequency spacing therebetween by one of them, there is generated a plurality of received signals each associated with a respective transmission path between a respective base station and the tag;

means for processing each received signal to determine a phase measurement for the first frequency component and a phase measurement for the second frequency component;

means for calculating a phase difference measurement for each received signal from the corresponding determined phase measurements; and means for determining the relative position of the tag and the base stations on the basis of the calculated phase difference measurements.

In a preferred embodiment, the tag is a transmit-only device which is operable to transmit the signal having the first and second frequency components, since this simplifies the design of the tag.

In another preferred embodiment, separate fixed tags are provided which operate in the same way as the or each mobile tag and are used to re-reference the signals received by the base stations to a common reference clock signal. In this way, the receivers do not need to be synchronised with each other. Preferably the or each fixed tag is located at the same location as a corresponding one of the base stations, since this reduces the computational complexity of the position calculations.

In another preferred embodiment, the transmitted signal comprises at least three frequency components in which the spacing between the first and second frequency components is greater than the spacing between the second and third frequency components, whereby a coarse position measurement can be obtained using the phase difference measurements from the first and second frequency components and a fine position measurement can be obtained from the phase difference measurements obtained from the second and third frequency components.

Various other advantageous features and aspects of the present invention will become apparent from the following detailed description of exemplary embodiments which are described with reference to the accompanying drawings in which:

FIGS. 16a, 16b and 16c are time plots illustrating the use of the relative wavelengths of the frequency differences to determine the coarse, medium and fine position estimates;

FIG. 21 is a block diagram showing the functional elements of a tag transmitter used in a sixth embodiment;

FIG. 22 is a block diagram showing the functional elements of a receiver used in the sixth embodiment;

FIRST EMBODIMENT

Overview

Figure 1:
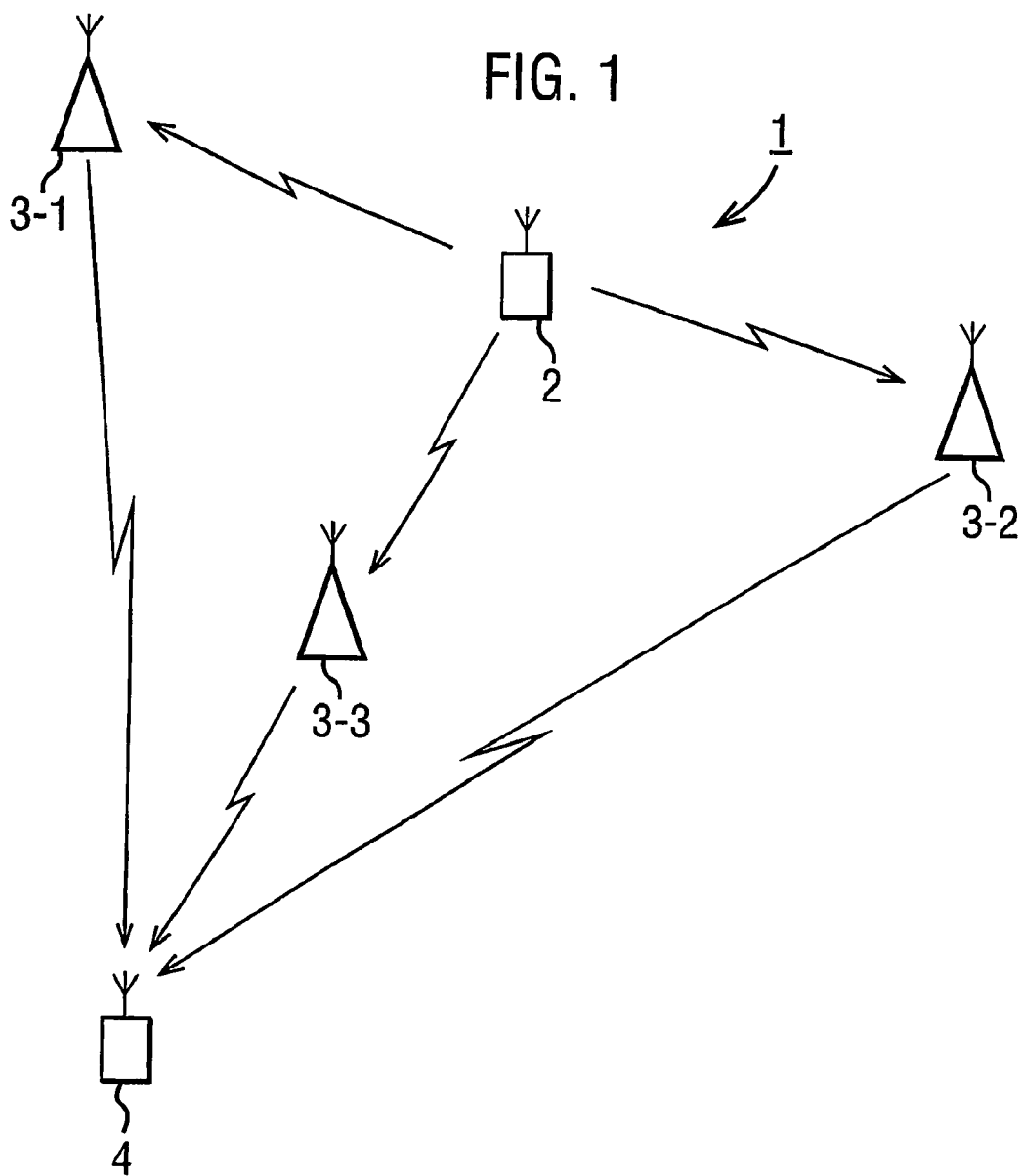
FIG. 1 is a schematic drawing showing a tracking system of a first embodiment for tracking the position of a moving object.

FIG. 1 illustrates the tracking environment 1 in which the tracking system of the present embodiment operates. The tracking system is used in this embodiment for tracking the position of a mobile tag 2 which is attached to a jockey on a horse (not shown) which is to be tracked. The mobile tag 2 carried by the jockey transmits a signal which is received, in this embodiment, by three fixed-receivers 3-1, 3-2 and 3-3. The receivers 3 process the received signals and transmit the processed signals to a position processor 4 which then calculates the position of the mobile tag 2 from the signals received from the receivers 3. In this embodiment, the mobile tag 2 transmits two tones (tone A and tone B) of different frequency which enables the system to be able to determine the absolute position of the mobile tag over a relatively large operating range whilst maintaining position sensing accuracy. The reason for this will now be described with reference to FIG. 2.

Figure 2:
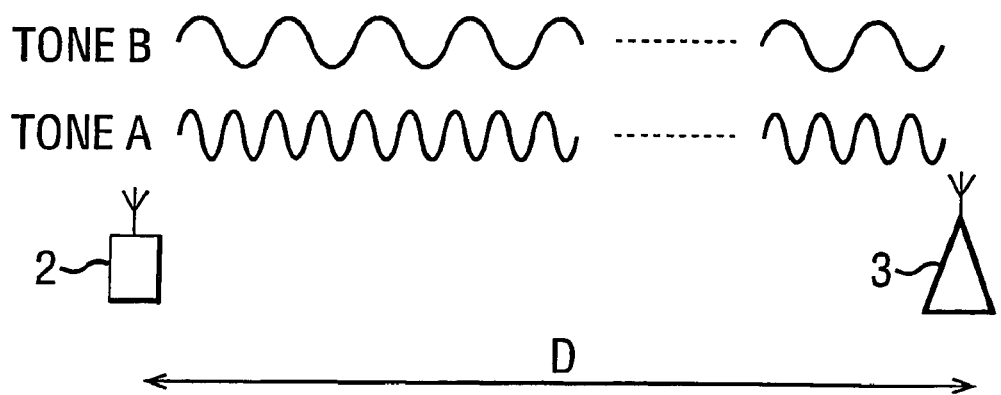
FIG. 2 is a schematic diagram showing two tone signals and their respective phases between a tag transmitter and a receiver of the system shown in FIG. 1.

When a single tone is transmitted between the tag 2 and a receiver 3, in order to be able to determine absolute position from a measurement of the phase of the received signal, the distance between the tag 2 and the receiver 3 must be less than the wavelength of the transmitted tone. If this is not the case, then a phase ambiguity problem arises. As discussed above in the introduction, for an application such as horse racing, this may require a transmission frequency in the kilohertz or megahertz part of the radio spectrum. However, when two tones of different frequencies are transmitted, it is the difference between the frequencies which sets the maximum possible unambiguous range of measurement. This is because, as illustrated in FIG. 2, the instantaneous phase relationship between the two tones (tone A and tone B) changes in each wavelength and repeats at a frequency given by the difference between the frequencies of the two tones. Therefore, with a two tone system, the maximum unambiguous range of measurement is given by the following equation:

$$\text{MAX RANGE} = \frac{c}{f_A - f_B} \quad (1)$$

where c is the speed of light, $f_A$ is the frequency of tone A and $f_B$ is the frequency of tone B. In other words, the maximum range is not dependent on the actual frequency of the transmitted signals but only on their difference in frequency. Therefore, frequencies from parts of the radio spectrum which are not regulated can be used. For example, two tones separated by 1 MHz could be transmitted within the 2.4 to 2.485 GHz bandwidth which is allocated for use without a licence in accordance with IEEE Standard 802.11. Such a system would be able to provide absolute position measurement over a range of approximately 300 metres (whereas a single tone at such a frequency would provide an unambiguous range of measurement of about 10 cm).

Mobile Tag

Figure 3:
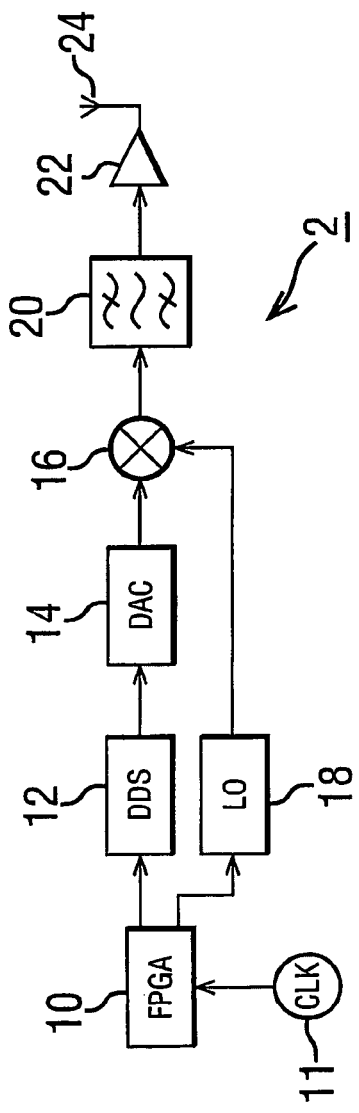
FIG. 3 is a block diagram showing the functional elements of the tag transmitter used in the first embodiment.

A description will now be given with reference to FIGS. 3 and 4 of the functional elements of the mobile tag 2 used in the first embodiment. As shown, the tag 2 has a Field Programable Gate Array (FPGA) 10 which receives a clock input from a crystal oscillator (CLK) 11. The FPGA 10 outputs data identifying the frequency, the starting phase and the duration of a signal to be synthesised to a Direct Digital Synthesizer (DDS) 12. In response, the DDS 12 generates the tone at the desired frequency starting from the described start phase and for the desired duration. In this embodiment, the FPGA 10 is programmed to cause the DDS 12 to generate a first frequency, followed by a second frequency, followed by a pause, followed once again by the first frequency then the second frequency and again a pause in a constantly repeating pattern. In this embodiment, the DDS 12 does not directly generate gigahertz signals. Instead, it generates intermediate frequencies in the range of 70 MHz to enable the use of simpler components therein. The digital signal output by the DDS 12 is then converted into an analogue signal by the digital-to-analogue converter (DAC) 14. This signal is then up-converted to the appropriate transmission frequency (2.410 GHz for tone A and 2.409 GHz for tone B in this embodiment) by mixing it in a mixer 16 with an appropriate mixing signal generated by the local oscillator 18. In this embodiment, the local oscillator 18 is programmable and generates a mixing frequency as defined by a signal received from the FPGA 10. The mixed signal is then filtered by a filter 20 to remove unwanted components from the mixing operation and then the filtered signal is amplified by a power amplifier 22 and transmitted (broadcast) via the antenna 24.

Figure 4:
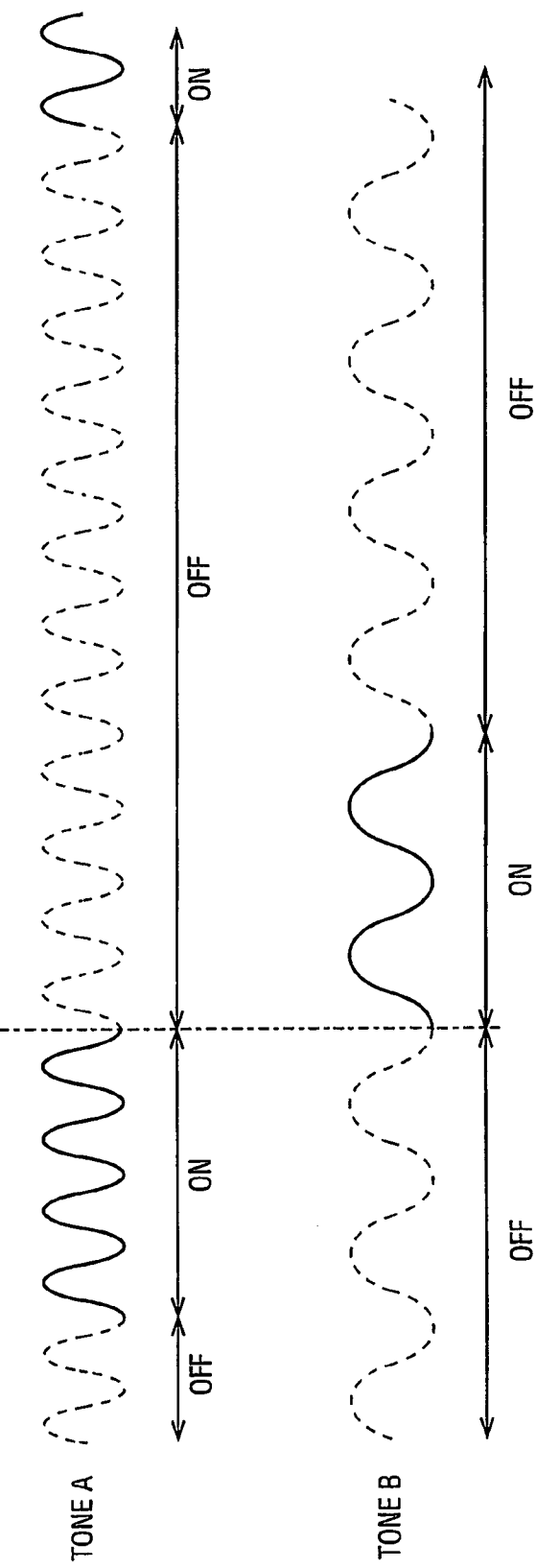
FIG. 4 is a timing diagram illustrating the way in which the tag shown in FIG. 3 outputs the two tone transmit signal.

FIG. 4 illustrates the form of the two tone signal transmitted by the mobile tag 2 in this embodiment. As can be seen from FIG. 4, the two tones (tone A and tone B) have different frequencies (not shown to scale), with tone A being transmitted first then tone B followed by no tone, followed by tone A again, tone B, no tone and so on. Each pulse sequence of tone A followed by tone B transmitted by the mobile tag 2 will be referred to hereinafter as a chirp. In this embodiment, the duration of each tone pulse is approximately 300 μs giving a total chirp duration of approximately 600 μs and the chirp repetition interval is approximately 100 ms.

The dashed lines shown in FIG. 4 illustrate that when a tone starts to be transmitted after a pause, the phase of the tone at that time is the same as it would have been had the tone been continuously transmitted since the last pulse. The start phase of each pulse is determined by the FPGA 10 from the start phase of the previous tone, the frequency of the tone and the time elapsed since the beginning of the last pulse. In this embodiment, the repetition rate is chosen to ensure that each chirp starts from the zero phase point of a basic reference frequency derived from the clock oscillator 11.

Since this embodiment determines the position of the mobile tag 2 by considering the phase of a signal transmitted by the tag, it is important to consider the source of the signal generated by the tag, its phase and any phase shifts added by the components in the tag. The fundamental signal source in the tag is the crystal oscillator 11 used to generate the system clock (CLK) which operates at some predetermined frequency ($f_{clk}$) and which has some initial phase ($\phi_{clk}(t)$). Although not shown in FIG. 3, the DDS 12 generates its output using this clock signal. It does this by, effectively, frequency multiplying the clock signal to generate the appropriate intermediate frequency signals which it outputs to the digital-to-analogue converter 14. Therefore, the phase of the signal output from the DDS 12 when tone A is transmitted can be represented by:

$$\phi_A^{DDS} = N_A \phi_{clk}(t) \quad (2)$$

and the phase of the signal output by the DDS 12 when tone B is transmitted can be represented by:

$$\phi_B^{DDS} = N_B \phi_{clk}(t) \quad (3)$$

where $N_A$ and $N_B$ represent the effective multiple of the clock frequency for tone A and tone B respectively. The local oscillator 18 operates in a similar manner so that the phase of the mixing signal can be represented by:

$$\phi_{LO} = K \phi_{clk}(t) \quad (4)$$

where K represents the effective multiple of the clock frequency for the mixing signal. The other components of the tag (i.e. the DAC 14, the mixer 16, the filter 20, the power amplifier 22 and the antenna 24) each introduce a phase delay. However, in this embodiment, it is assumed that these phase delays are the same for each of the tones and therefore the phase ($\phi_A$) of the transmitted signal for tone A can be represented by:

$$\phi_A = N_A \phi_{clk}(t) + K \phi_{clk}(t) + \phi_c \quad (5)$$

and the phase ($\phi_B$) of the transmitted signal for tone B can be represented by:

$$\phi_B = N_B \phi_{clk}(t) + K \phi_{clk}(t) + \phi_c \quad (6)$$

where $\phi_c$ is the constant phase delay added by the DAC 14, the mixer 16, the filter 20, the power amplifier 22 and the antenna 24.

Receiver

The receivers 3-1, 3-2 and 3-3 used in this embodiment are functionally the same and a description of the functional elements of one of the receivers 3 will now be given with reference to FIGS. 5, 6 and 7.

Figure 5:
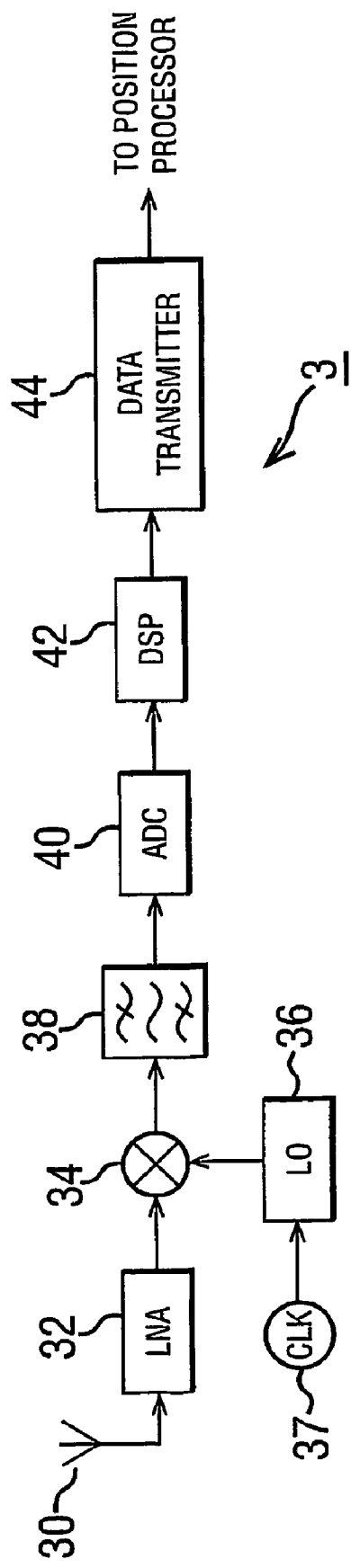
FIG. 5 is a block diagram showing the functional elements of the receiver used in the first embodiment.

As shown in FIG. 5, the signal is received by the receive antenna 30 and is passed to a low noise amplifier 32 where the received signal is amplified. The amplified signal is then passed to a mixer 34 where it is mixed with a signal generated by local oscillator 36 to down-convert the received signal from the transmitted gigahertz frequency to the intermediate frequency at approximately 70 MHz. As shown, the local oscillator 36 generates the mixing signal from a local clock signal which is generated from a crystal oscillator (CLK) 37 which is the same as the oscillator 11 used in the mobile tag 2. The output from the mixer 34 is then filtered by a bandpass filter 38 to remove unwanted frequency components from the mixed signal and is then passed to an analogue-to-digital converter 40 which converts the down-converted signals into digital signals. The digital samples output by the ADC 40 are then input to a digital signal processor (DSP) 42 which processes the samples to generate data that varies with the phase of the received signal.

The signal received by the receiver 3 will correspond to the signal transmitted by the mobile tag 2, however the passage of the signal through the air introduces a further phase delay proportional to the distance the signal has travelled. The received signal phase for tone A and tone B at receiver R can therefore be represented by:

$$\phi_A^R = N_A \phi_{clk}(t) + K \phi_{clk}(t) + \phi_c + \phi_{dA}^R(t) \quad (7)$$

and $$\phi_B{}^R = N_B \phi_{clk}(t) + K\phi_{clk}(t) + \phi_c + \phi_{dB}{}^R(t) \quad (8)$$

In this embodiment, it is assumed that the crystal oscillators in the receivers 3 and the mobile tag 2 are perfectly synchronised with each other. Therefore, the terms of the received phase involving $\phi_{clk}(t)$ can be ignored. Further, as with the similar components of the mobile tag 2, the receive antenna 30, the low noise amplifier 32, the mixer 34, the filter 38, the analogue-to-digital converter 40 and the digital signal processor 42 will introduce a phase delay into the received phase. However, in this embodiment it is assumed that these phase delays are constant for a given chirp and can be incorporated within the expression for $\phi_c$.

The phase data generated by the DSP 42 is then passed, together with a time stamp for the measurement and a receiver ID, to a data transmitter 44 which, in this embodiment, packages the data using a suitable network protocol (such as TCP/IP) and transmits the data to the position processor 4 over an appropriate data network. In the present embodiment, the link between the receivers 3 and the position processor 4 is made using a wireless network. That is a conventional computer network system implemented without wires but using radio transmitters. Examples of such a wireless network include AirPort™ and Wi-Fi™ systems.

Position Processor

Figure 6:
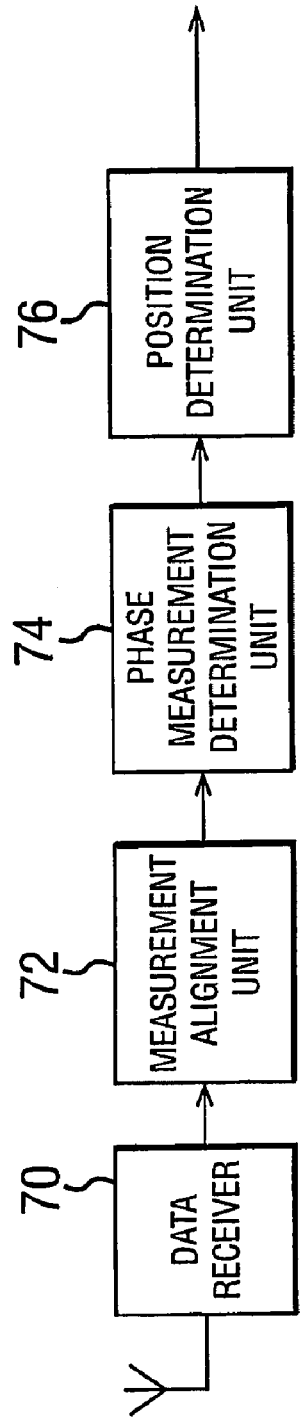
FIG. 6 is a block diagram showing the functional elements of a position processor used in the first embodiment to process the signals received from all of the receivers to determine the current position of the moveable object.
Figure 7:
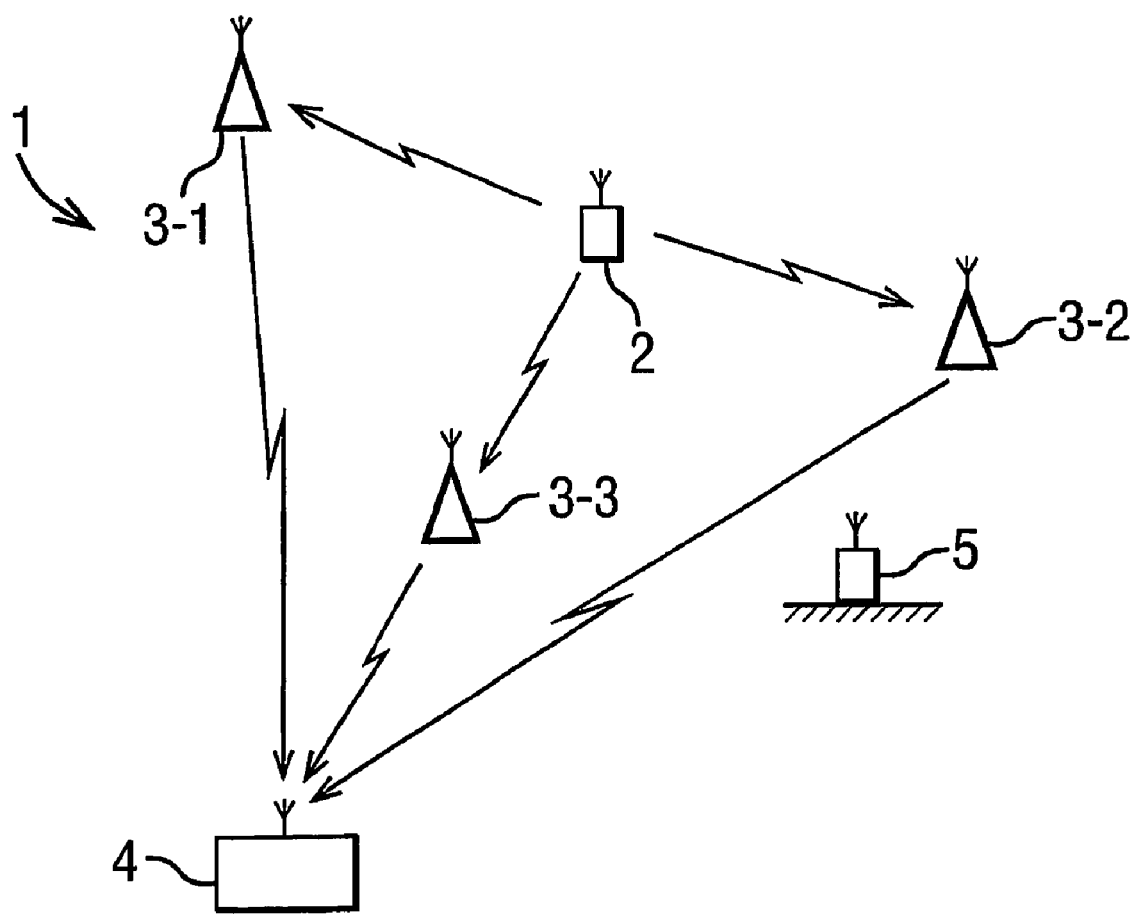
FIG. 7 is a schematic diagram showing a tracking system of a second embodiment for tracking the position of a moving object.

Referring now to FIG. 6, the position processor 4 used in this embodiment will now be described in detail. The data transmitted to the position processor from all of the receivers 3 is received by data receiver 70 which extracts the phase data from the network packaging and control data that was added for transmission purposes. The extracted phase data is then passed to a measurement alignment unit 72 which processes the received phase data to group the phase data for the same chirp from all of the receivers into a separate cluster. This is required since data transmitted over a TCP/IP network may not arrive at the receiver in the order that it was transmitted. The measurement alignment unit 72 does this using the transmitted time stamp data and by waiting until the data, from all of the receivers for a given chirp should have been received, allowing for the network latency.

The aligned measurements for a current chirp are then passed to a phase measurement determination unit 74 which performs a subtraction operation to subtract the phase measurements associated with the tone B signal from the phase measurements associated with the tone A signal. In particular, the phase measurement determination unit 74 subtracts the phase measurement from receiver 1 for tone B from the phase measurement from receiver 1 for tone A, to generate a phase difference measurement for receiver 1. The phase measurement determination unit 74 also does this for the phase measurements received from the other receivers. In this embodiment, there are three receivers 3-1, 3-2 and 3-3 which receive the tone A and tone B signals transmitted by the mobile tag 2. Therefore, the phase measurement determination unit 74 will generate the following three phase difference signals, for each chirp transmitted from the tag, which are passed to the position determination unit 76.

$$\Delta\phi^1(t) = \phi_{dA}{}^1(t) - \phi_{dB}{}^1(t) = d_1(t)[f_A - f_B]/c$$

$$\Delta\phi^2(t) = \phi_{dA}{}^2(t) - \phi_{dB}{}^2(t) = d_2(t)[f_A - f_B]/c \quad (9)$$

$$\Delta\phi^3(t) = \phi_{dA}{}^3(t) - \phi_{dB}{}^3(t) = d_3(t)[f_A - f_B]/c$$

where $d_1(t)$ is the distance between the mobile tag 2 and receiver 3-1 at time t; $d_2(t)$ is the distance between the mobile tag 2 and the receiver 3-2 at time t; $d_3(t)$ is the distance between the mobile tag 2 and the receiver 3-3 at time t; $f_A$ is the frequency of the transmitted tone A; and $f_B$ is the frequency of the transmitted tone B. As can be seen from equation (9), by taking the phase difference of the phase measurements from each receiver, the common phase delay ($\phi_c$) introduced by the electronic components of the mobile tag 2 and the receivers 3 has been removed from the calculation.

The position determination unit 76 uses the three phase difference measurements obtained from the phase measurement determination unit 74 (together with the known transmission frequencies of the mobile tag 2) to generate a value for the distance between the mobile tag 2 and each of the receivers 3. From these distances, it determines the position of the mobile tag relative to the known position of the receivers 3. This position measurement will be an absolute measurement, provided the mobile tag 2 is within one wavelength of the beat frequency ($f_A - f_B$) of the transmitted tones. The way in which these calculations are done is well known to those skilled in the art and will not be described further here.

Second Embodiment

In the first embodiment, it was assumed that the clocks in the tag and in the receivers 3 were synchronised to one another. Whilst this is possible to achieve, it is impractical for most applications. A second embodiment will now be described in which the tag and the receivers are not synchronised. In this embodiment, the mobile tag 2 has the same general architecture as the mobile tag 2 used in the first embodiment. In this embodiment, a network calibration technique is used to account for the lack of synchronisation between the receivers 3. This calibration technique uses signals transmitted from a fixed tag 5 whose position is known and which is constructed and operates in the same way as the mobile tag 2.

Figure 8:
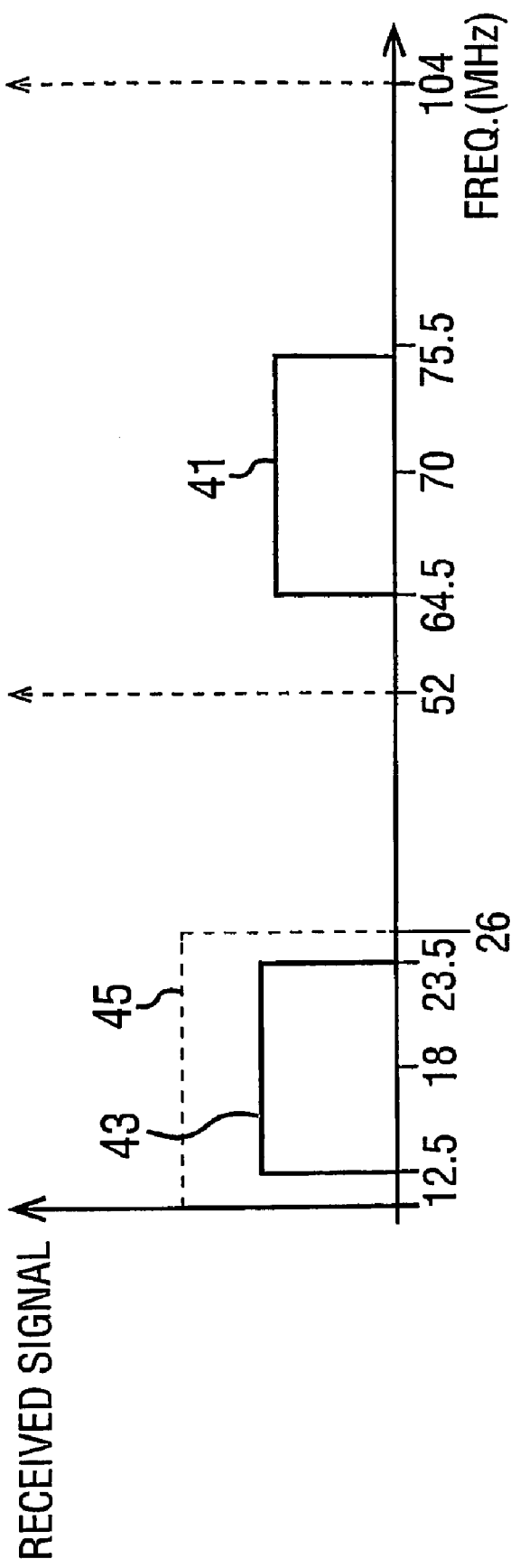
FIG. 8 is a graphical representation of the sampling process used by the DSP of the receiver used in the second embodiment.

In this embodiment, the processing carried out by the digital signal processor 42 in each receiver 3 is different to the processing carried out in the DSP 42 used in the first embodiment. A more detailed description will now be given of the operation of the ADC 40 and of the DSP 42 used in this embodiment with reference to FIGS. 8 and 9. In this embodiment, the receivers 3 are arranged to digitise a frequency band of 11 MHz which is centred around the 70 MHz intermediate frequency. It does this using sub-sampling techniques by sampling the down-converted signal at 52 MHz. Sub-sampling this frequency band at this rate results in a digitised version of this 11 MHz band centred at 18 MHz. This is illustrated in FIG. 8 which shows the 11 MHz band 41 which is centred at 70 MHz and the corresponding sub-sampled 11 MHz band 43 which is centred at 18 MHz. As shown in FIG. 8, this sub-sampled frequency band 43 lies entirely within the Nyquist band represented by the dashed box 45. The techniques of sub-sampling are well known and will not be described further.

Figure 9A:
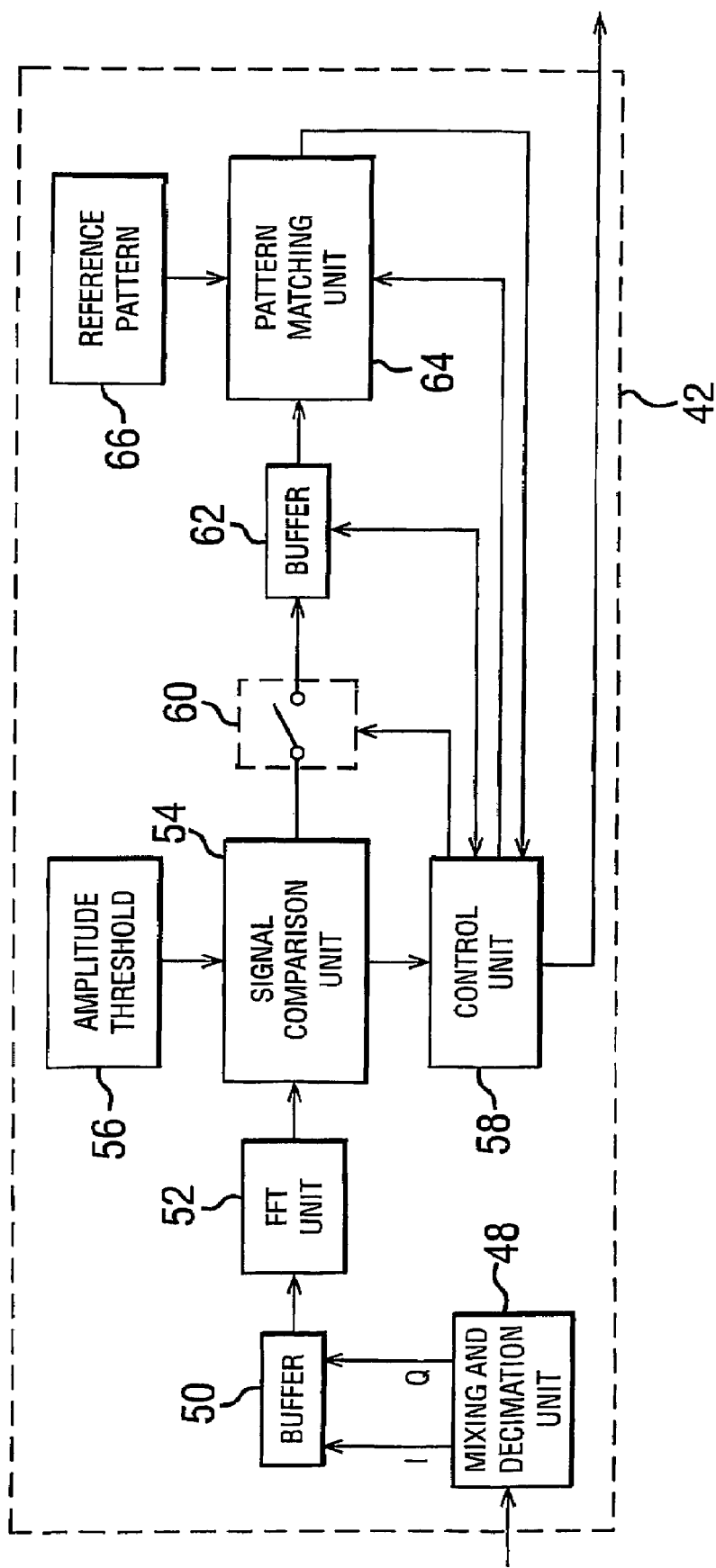
FIG. 9a is a block diagram showing the functional elements of a digital signal processor block which forms part of the receiver shown in FIG. 5.
Figure 9B:
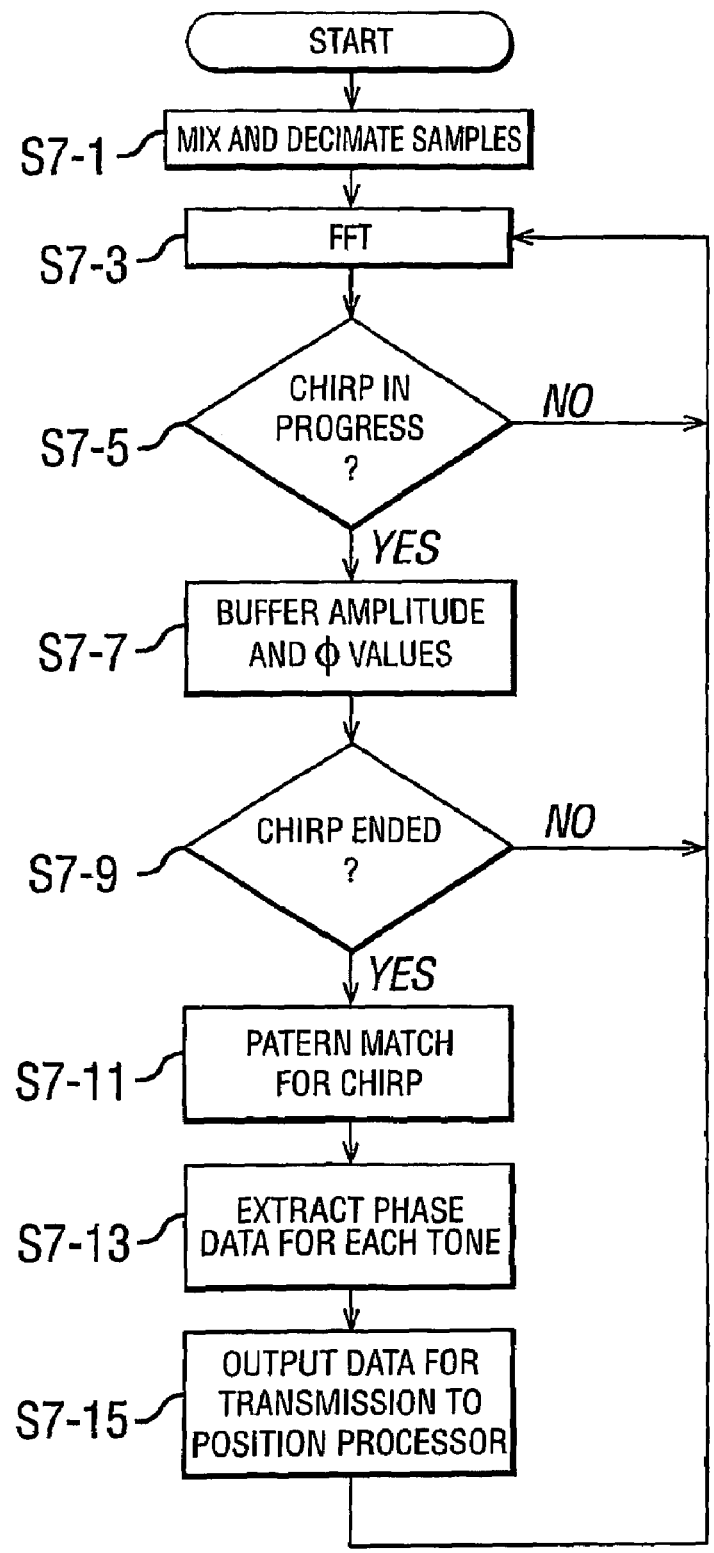
FIG. 9b is a flow chart illustrating the main processing steps performed by the digital signal processor of the receiver shown in FIG. 5.

As shown in FIG. 9a, the samples generated by the analogue-to-digital converter 40 are input to a digital mixing and decimation unit 48 in the DSP 42, where the digitised frequency band 43 is mixed to baseband to generate in phase (I) and quadrature phase (Q) samples which are then decimated by four (step S7-1 in FIG. 9b). The resulting 13 mega I and Q samples per second are stored in a buffer 50. Blocks of these samples are then passed one block at a time to a Fast Fourier Transform (FFT) unit 52 which performs a complex FFT (step S7-3) using both the in phase (I) and quadrature phase (Q) signals in the block. In this embodiment, the FFT takes a 256 point FFT on blocks of 256 I and 256 Q samples. With the above sampling rate, this means that the FFT unit 52 produces an FFT output (which takes the form of an array of amplitude and phase values for a number of different frequencies for each block of input samples) at a rate of one every 19.7 μs.

When the mobile tag 2 transmits a pulse either of tone A or tone B, the output from the FFT unit 52 should include an amplitude value and a phase value for that tone. Since the mobile tag 2 transmits pulses of approximately 300 μs of each tone, this means that there should be 15 (300/19.7) consecutive FFT outputs having an amplitude and phase value which corresponds to the transmitted tone. The FFT calculated for each block of samples is input to a signal comparison unit 54 which determines whether or not the current FFT might form part of a chirp (step S7-5). It does this by comparing the amplitude values in the received FFT with an amplitude threshold stored in the store 56. The result of this comparison is passed to a control unit 58 which controls the position of a switch 60 so that if any of the amplitude values in the current FFT are above the threshold, then those amplitude values and the corresponding phase values are stored (step S7-7) together with an indication of the frequencies with which those amplitude values are associated and with a time stamp identifying the current FFT. These amplitude and phase values will continue to be stored in the buffer 62 until the signal comparison unit 54 and the control unit 58 identify (what they think is) the end of the chirp (step S7-9) by detecting when the amplitude values fall below the amplitude threshold 56.

As those skilled in the art will appreciate, whilst the use of the comparison unit and the amplitude threshold avoids the processing of general background noise, sometimes the background noise at particular frequencies will be above the threshold and will cause the corresponding FFT values to be stored in the buffer 62. Therefore, in this embodiment, the data values stored in the buffer 62 are passed to a pattern matcher 64 which looks for patterns in the data stored in the buffer 62 which are characteristic of a chirp produced by the mobile tag 2. In particular, as mentioned above, the mobile tag 2 outputs a chirp comprising approximately 300 μs of tone A followed by approximately 300 μs of tone B. Therefore, the FFT data corresponding to a chirp should include an amplitude and phase value corresponding to tone A in fifteen consecutive FFT outputs followed by an amplitude and phase value corresponding to tone B in fifteen consecutive FFT outputs. This expected pattern is stored in the reference pattern store 66 and the pattern matching unit 64 compares the data stored in the buffer 62 with this reference pattern in order to determine whether or not the data actually corresponds to a chirp. By performing this pattern matching operation, the receiver reduces further the risk of outputting erroneous position information.

Figure 9C:
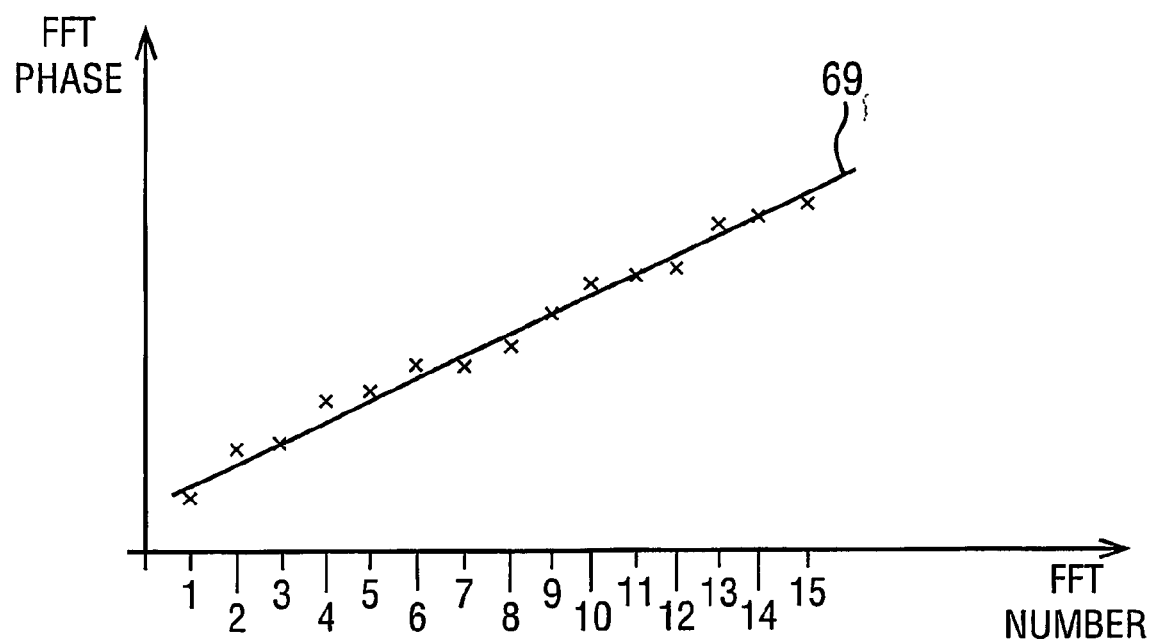
FIG. 9c is a graphical representation of the different FFT results obtained for each tone of each chirp received by the receiver.

When the pattern matching unit 64 identifies that the data stored in the buffer 62 corresponds to a chirp, it determines a time stamp for the chirp from a receiver clock and determines the optimum timeslots for the presence of each tone. In this embodiment, the receiver clock is a simple sample counter which is incremented by one for each block of 256 samples received. This information is then passed to the control unit 58 which then extracts phase information for both tone A and tone B from the identified values stored in the buffer 62 and outputs (step S7-15) this phase information from the DSP 42 to the data transmitter 44. In this embodiment, the control unit 58 outputs a single set of phase measurements for each of tone A and tone B for each chirp. However, as mentioned above, the buffer 62 will hold fifteen consecutive FFT outputs having amplitude and phase values which correspond to each transmitted tone. If the clock frequencies of the tag 2 and the receiver 3 are perfectly synchronised and chosen so that each of the tones is centred within the corresponding FFT frequency bin, then the fifteen FFT phase values for each of the transmitted tones will remain constant. However, since the clock frequencies are not synchronised in this embodiment, the phase terms for these fifteen FFT outputs will be different. Fortunately, during a single chirp, it is unlikely that the synchronisation between the mobile tag 2 and the receiver 3 will change and therefore the change in the phase values between successive FFT outputs should be approximately the same. This is illustrated in FIG. 9c which shows the fifteen phase values obtained from fifteen consecutive FFT outputs and the line 69 which best fits these points, the gradient of which depends upon the lack of synchronisation between the transmitter and receiver clocks.

Consequently, in this embodiment, the control unit 58 determines the gradient of the best fit line 69 (using a least squares regression algorithm) and outputs this slope measurement (referred to hereinafter as the phase slope measurement $\phi_S$) together with the phase value measured from the best fit line 69 at a position corresponding to one of the fifteen FFT outputs (referred to hereinafter as the phase offset measurement $\phi_O$). It does not matter which one of the phase values is used as the phase offset measurement. However, in order to avoid possible problems with phase offset measurements at the beginning and the end of the pulse, in this embodiment, the control unit outputs the phase offset measurement ($\phi_O$) of the best fit line 69 corresponding to the eighth FFT (i.e. the FFT obtained in the middle of the tone pulse). In this embodiment, the frequency of the two tones A and B have been chosen so that they will both appear at approximately the same position within the corresponding FFT frequency bin relative to the centre of that bin. As a result, the phase slope measurement for tone A and the phase slope measurement for tone B should be approximately the same. However, in this embodiment, separate phase slope measurements ($\phi_{sA}$ and $\phi_{sB}$) are taken and used to detect for corruption of the chirp data. These two phase measurements are then output to the data transmitter 44 together with the time stamp for that chirp and the receiver ID.

In addition to receiving the chirps from the mobile tag 2, the receivers 3 also receive chirps from the fixed tag 5. The receivers process these chirps in the same way to generate corresponding phase measurements for the signals received from the fixed tag 5. As will be described below, the phase measurements obtained from the fixed tag 5 are used to correct for the lack of synchronisation of the receivers 3.

Figure 10:
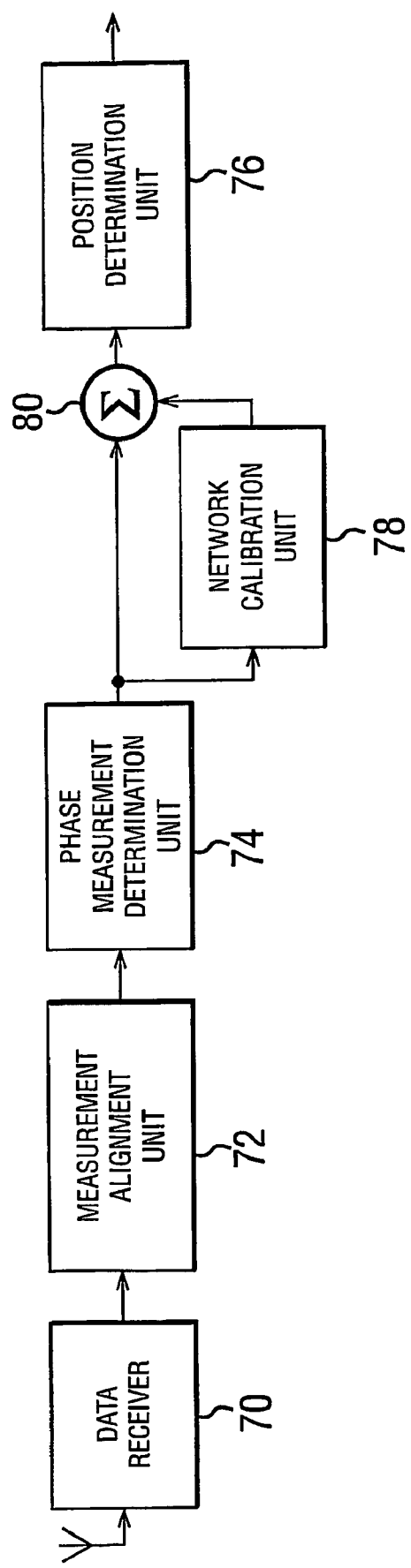
FIG. 10 is a block diagram showing the functional elements of the position processor used in the second embodiment to determine the current position of the moveable object.

Referring now to FIG. 10, the position processor 4 of the second embodiment will now be described in more detail. In the position processor 4, the data receiver 70 and measurement alignment unit 72 operate in the same way as described above with reference to FIG. 6 in the first embodiment. The purpose of the phase measurement determination unit 74 is to subtract the phase offset measurement for tone B of a given chirp received at a given receiver from the phase offset measurement for tone A for the same chirp received at the same receiver. However, as noted above, there is a constant drift in the measured phase caused by the lack of synchronisation between the mobile tag clock and the receiver clock (measured as the phase slope measurement $\phi_s$) and as there are 15 FFT operations between the phase offset measurement ($\phi_{oA}$) for tone A and the phase offset measurement ($\phi_{oB}$) for tone B, the phase measurement determination unit 74 must add in a correction based on the phase slope measurements $\phi_{sA}$ and $\phi_{sB}$ in order to extrapolate these measurements to a common time. In this embodiment, the phase offset measurements are extrapolated to a point in time midway between the times of the two tones being subtracted. To do this, the determination unit 74 multiplies the phase slope measurement for tone A ($\phi_{sA}$) by 7.5 (since normalised units of time are used to determine the phase slope measurement $\phi_s$ rather than seconds) and then adds this to the phase offset measurement for tone A ($\phi_{oA}$). The determination unit 74 also multiplies the phase slope measurement for tone B ($\phi_{sB}$) by 7.5 and then subtracts this from the phase offset value measured for tone B ($\phi_{oB}$). Thus the sum performed by the phase measurement determination unit 74 is as follows:

$$\Delta\phi_{TR}(t=C) = \phi_{oA}^{TR}(t=C) + 7.5\phi_{sA}^{TR}(t=C) - [\phi_{oB}^{TR}(t=C) - 7.5\phi_{sB}^{TR}(t=C)] \quad (10)$$

which in this embodiment gives the phase difference measure for tag T from the signals received at receiver R at the time corresponding to the middle of the chirp (i.e. at t=C). As in the first embodiment, the phase difference calculated is equivalent to subtracting equation (8) from equation (7) but this time not ignoring the $\phi_{clk}(t)$ terms as follows:

$$\Delta\phi_{TR}(C) = (N_A - N_B)\phi_{clk}^{TR}(C) + \phi_{dA}^{TR}(C) - \phi_{dB}^{TR}(C) \quad (11)$$

where $\phi_{clk}^{TR}(C)$ is the difference between the clock phase of the tag (T) and the clock phase of the receiver (R) at the time corresponding to the middle of the chirp (ie $\phi_{clk}^{tag}(C) - \phi_{clk}^{R}(C)$) As before, the constant phase lag $\phi_c$ has been cancelled together with the common term involving the up-converter multiple K.

In this embodiment, the phase difference measurements obtained from chirps transmitted by the mobile tag 2 are output directly to the adder 80 and the phase difference measurements obtained from chirps transmitted by the fixed tag 5 are output to a network calibration unit 78 which calculates correction values to be added to the phase difference measurements obtained from chirps transmitted by the mobile tag 2 in the adder 80. The phase difference measurements obtained for the mobile tag 2 vary with the phase difference between the clock frequency of the tag 2 and the clock frequency of the receiver from which the measurement is derived. In this embodiment the calibration unit 78 calculates correction values to be added to these phase difference measurements in order to effectively reference the measurements from all of the receivers 3 back to a single clock—that of the fixed tag 5, thereby removing their dependance on the different phases of the receiver clocks. It does this by adding the following correction value:

$$\text{Correction value }(R) = -(N_A - N_B)\phi_{clk}^{fxdR}(t=C) \quad (12)$$

where $\phi_{clk}^{fxdR}(C)$ represents the difference in the phase of the fixed tag 5 relative to the phase of the receiver R at the time corresponding to the middle of the chirp transmitted by the mobile tag 2 (ie $\phi_{clk}^{fxd}(t=C) - \phi_{clk}^{R}(t=C)$). Since the position of the fixed tag is known, the value of $\phi_{clk}^{fxdR}$ at the time corresponding to when the fixed tag transmits its chirp can be determined. However, since there is likely to be a frequency offset between the frequency of the clock in the fixed tag and the frequency of the clock in the receiver, this phase difference will have changed by the time that the chirp from the mobile tag is received. Therefore, in this embodiment, the network calibration unit 78 monitors the way in which $\phi_{clk}^{fxdR}$ changes with time by monitoring how these value changes over a number of chirps transmitted by the fixed tag 5. It then uses this history of information to determine what $\phi_{clk}^{fxdR}$ will be at the time of the chirp from the mobile tag. It then uses this value to work out the appropriate correction value using equation (12) above.

Thus, when a phase difference value for a chirp transmitted by the mobile tag 2 and received by receiver 3-1 is output by the phase measurement subtraction unit 74, calibration unit 78 outputs the specific correction value for that chirp and for receiver 3-1, to the adder 80 where it is added to the phase difference measurement from the determination unit 74.

Adding the appropriate correction value to equation 11 gives the following corrected phase difference measurement:

$$\Delta\phi_{TR}^{corr}(C) = \phi_{oA}^{TR}(C) - \phi_{oB}^{TR}(C) + 15\phi_s^{TR}(C) - (N_A - N_B)\phi_{clk}^{fxdR}(C) \quad (13)$$
$$= (N_A - N_B)[\phi_{clk}^{mob}(C) - \phi_{clk}^{fxd}(C)] + \phi_{dA}^{TR}(C) - \phi_{dB}^{TR}(C)$$

As can be seen from equation 13, the corrected phase difference values are no longer dependent on the phase of the receiver clocks. Instead they are all referenced back to the clock phase of the fixed tag (i.e. $\phi_{clk}^{fxd}(C)$). These corrected phase difference measurements are then passed to the position determination unit 76 and used to solve equation 13 to find the position of the mobile tag 2 and to determine the phase of the mobile tag's clock relative to that of the fixed tag 5 (at the time of the current chirp being processed). In this embodiment, the position determination unit 76 uses an iterative numerical reduction method to solve for these unknowns from these corrected phase difference measurements. The way that it does this will now be described in more detail. In order to illustrate the calculations that are performed by the position determination unit 76, it is necessary to expand equation 13 to introduce the distance between the mobile tag 2 and the respective receivers 3. The relationship between ($\phi_{dA}^{TR}(C) - \phi_{dB}^{TR}(C)$) is given in equation 9 which can be expanded further in terms of the clock frequency of the tag 2 to give:

$$\phi_{dB}^{TR}(C) - \phi_{dA}^{TR}(C) = (N_A - N_B)f_{clk}d_{TR}(C)/c \quad (14)$$

Where $f_{clk}$ is the frequency of the clock 11 of the mobile tag 2. Substituting this into equation 13 gives:

$$\Delta\phi_{TR}^{corr}(C) = (N_A - N_B)[\phi_{Tf}(C) + f_{clk}d_{TR}(C)/c] \quad (15)$$

where $\phi_{Tf}(C)$ is the phase of the mobile tag clock relative to that of the fixed tag clock at the time of the current chirp (C). The unknowns in this equation are $\phi_{Tf}(C)$ and $d_{TR}(C)$. Since there are three receivers, there will be three equations involving the four unknowns $\phi_{Tf}(C)$, $d_{T1}(C)$, $d_{T2}(C)$ and $d_{T3}(t)$. However, as the positions of the receivers 3 are all known, the three distance measures can be re-referenced relative to a common origin and written in terms of a two dimensional position coordinate ($d_{Tx}(t)$, $d_{Ty}(t)$) using the following formula.

$$(d_{Tx}(t) - x_R)^2 + (d_{Ty}(t) - y_R)^2 = (d_{TR}(t))^2 \quad (16)$$

Where ($x_R, y_R$) is the position of receiver R in terms of this coordinate system. Substituting the above into equation 15 gives:

$$\Delta\phi_{TR}^{corr}(C) = (N_A - N_B)[\phi_{Tf}(C) + f_{clk}/c[(d_{Tx}(C) - x_R)^2 - (d_{Ty}(C) - y_R)^2]^{1/2}] \quad (17)$$

Therefore, there are now three unknowns ($d_{Tx}(C)$, $d_{Ty}(C)$, and $\phi_{Tf}(C)$) and three measurements ($\Delta\phi_{TR}^{corr}(C)$), from which these unknowns can be calculated. As mentioned above, in this embodiment, an iterative numerical reduction method is used to solve for these unknowns. This is done by firstly defining, the function $f_i(C)$ for each of the measurements (i) which equals the right hand side of equation 17 minus the left hand side. This function $f_i(C)$ should be equal to zero, however, due to approximations and other errors, it is likely that there will be a slight offset from zero. The position determination unit 76 then finds the values of the unknowns which minimise the sum of squares of these functions $f_i(C)$, ie:

$$F(d_{Tx}, d_{Ty}, \phi_{Tf}) = \sum_{i=1}^{3} f_i^2(C) \quad (18)$$

As this is a continuous and differentiable function, a set of partial derivatives of F for $d_{Tx}(C)$, $d_{Ty}(C)$ and $\phi_{Tf}(C)$ are derived and the equation solved numerically. This is done using the Broyden-Fletcher-Goldfarb-Shanno method which is a variant of the Davidon-Fletcher-Powell algorithm. This is a standard minimisation algorithm which finds the values of the unknown variables that minimise F and therefore a further description of it shall be omitted. The reader is referred to the publication "Numerical recipes in C," by Press, Teukolsky, Vettering and Flannery for further details of this algorithm.

Third Embodiment

Figure 11:
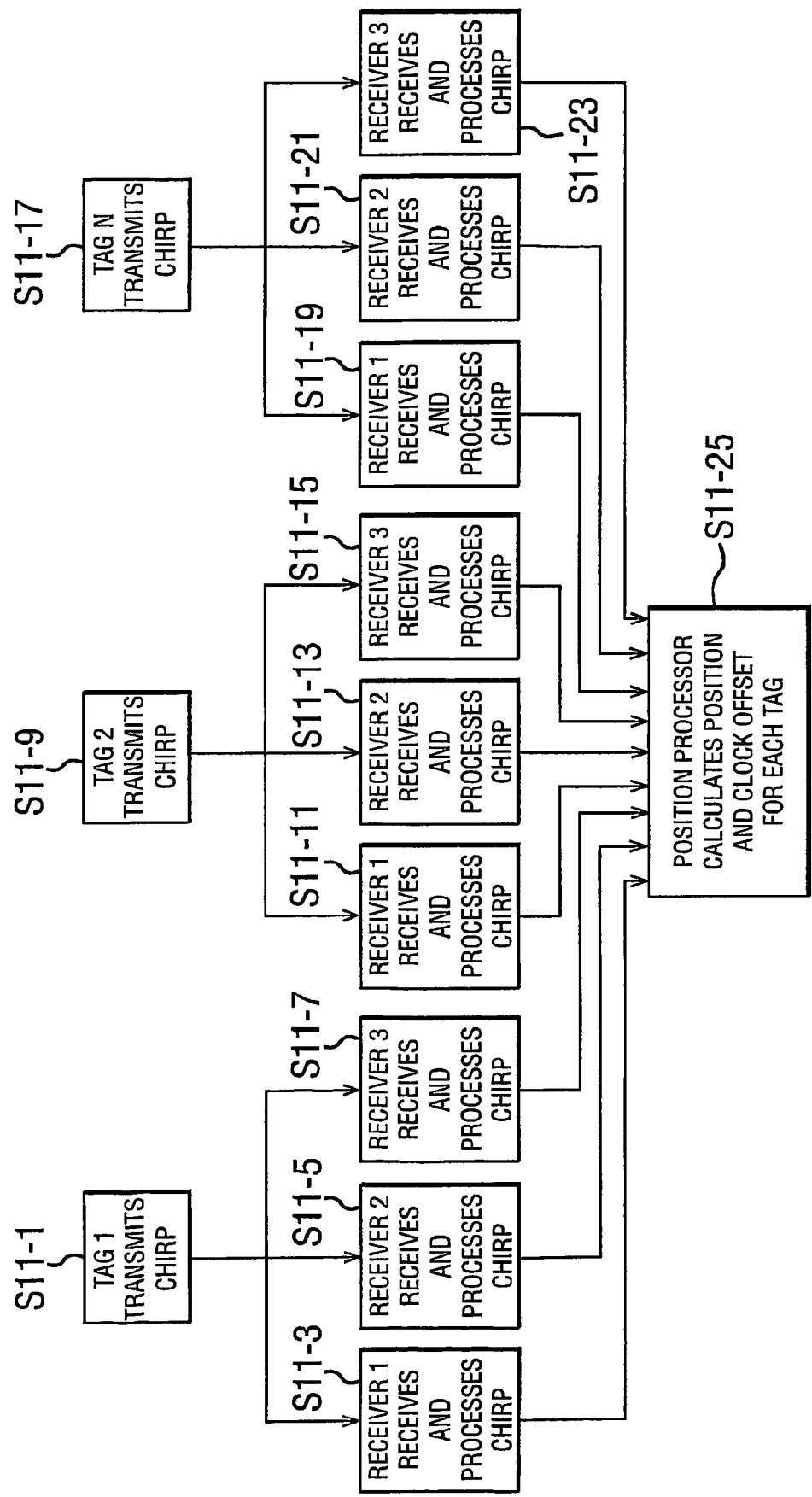
FIG. 11 is a flow chart showing the main operational steps performed by the elements of the tracking system in a third embodiment.

In the first and second embodiments described above, the position of a single mobile tag was determined and then tracked. A third embodiment will now be described in which there is more than one mobile tag 2 to be tracked. FIG. 11 is a schematic flow chart illustrating the operation of this embodiment for tracking N tags simultaneously. At step S11-1, tag 1 transmits a chirp. This chirp is received by receivers 1, 2 and 3 at steps S11-3, S11-5 and S11-7 respectively. Each of the receivers 1, 2 and 3 processes the chirp and transmits the phase measurement data to the position processor. In step S11-9, tag 2 transmits a chirp. This chirp is received by receivers 1, 2 and 3 at steps S11-11, S11-13 and S11-15 respectively. Again, the receivers process the received chirp and transmit the phase measurement data to the position processor. This process continues until the last tag, tag N, transmits a chirp at step S11-17 which chirp is received by the receivers 1, 2 and 3 at steps S11-19, S11-21 and S11-23 respectively. Thereafter tag 1 transmits another chirp followed by tag 2 etc. As before, the receivers 1, 2 and 3 process each received chirp and transmit the phase measurement data to the position processor 4. When the position processor receives the phase measurements for a tag, it immediately calculates the position and clock offset for that tag at step S11-25.

As those skilled in the art will appreciate, provided that each tag transmits on different frequencies, it is possible for all of the tags to transmit simultaneously. Alternatively, if frequencies are to be shared between the tags, then it is necessary for at least those tags sharing a frequency to transmit at different times. In this embodiment, however, each of the tags transmits on different frequencies so that the phase measurements received from the receivers can more easily be associated with the tag that transmitted the chirp. In the alternative embodiment where tags share frequencies, either the system must know when each tag is transmitting, or it must be able to deduce this from the determined position and from the previous positions of the tags that are sharing frequencies or some tag ID must be transmitted with the tones.

Figure 12:
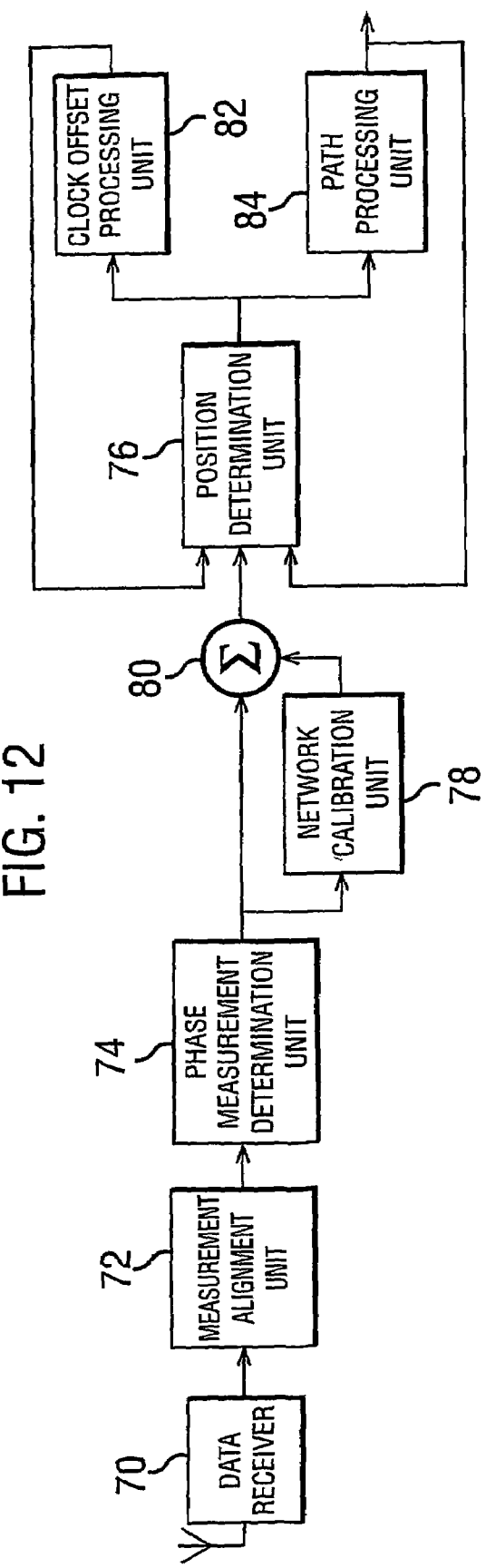
FIG. 12 is a block diagram showing the functional elements of the position processor of the third embodiment.

Referring now to FIG. 12, the functional elements of the position processor 4 used in this embodiment will now be described in more detail. The data receiver 70, the measurement alignment unit 72, the phase measurement subtraction unit 74, the network calibration unit 78, the adder 80 and the position determination unit 76 all operate in the same way as the corresponding elements of the second embodiment described above. However the output from the position determination unit 76 is, in the present embodiment, output to a clock offset processing unit 82 and a path processing unit 84. The clock offset processing unit 82 provides a feedback estimate of the phase of the mobile tag's clock relative to that of the fixed tag ($\phi_{Tf}(C)$) for each tag 2 to the position determination unit 76, in order to speed up the minimisation algorithm. In this embodiment, the clock offset processing unit 82 calculates the feedback estimates by considering the history of the relative phase for a mobile tag and the fixed tag and extrapolating from it to provide an estimated phase at the next chirp. This phase estimate is then used by the algorithms in the position determination unit 76 as a starting estimate for the relative phase ($\phi_{Tf}(C)$) during the processing of the signals from the next chirp from that tag 2.

The path processing unit 84 applies certain physical rules to the position data output by the position determination unit 76 to ensure that the position solution does not alter in such a fashion that would imply a physically impossible movement of the tag 2. For example, if the tags are constrained to move over a predetermined course, then positions outside this course must be invalid and so those position solutions are not allowed. The path processing unit 84 also uses time averaging to determine velocity information for each tag 2 and thus the output from the path processing unit 84 is, in this embodiment, a position and velocity for each mobile tag 2. As shown in FIG. 12, the output of the path processing unit 84 is also fed back into the position determination unit 76, also to provide starting estimates for the minimisation algorithm for that tag at the next chirp. This estimate is determined, in this embodiment, using the determined velocity measurement and the time between chirps from that tag.

Fourth Embodiment

Overview

Figure 13:
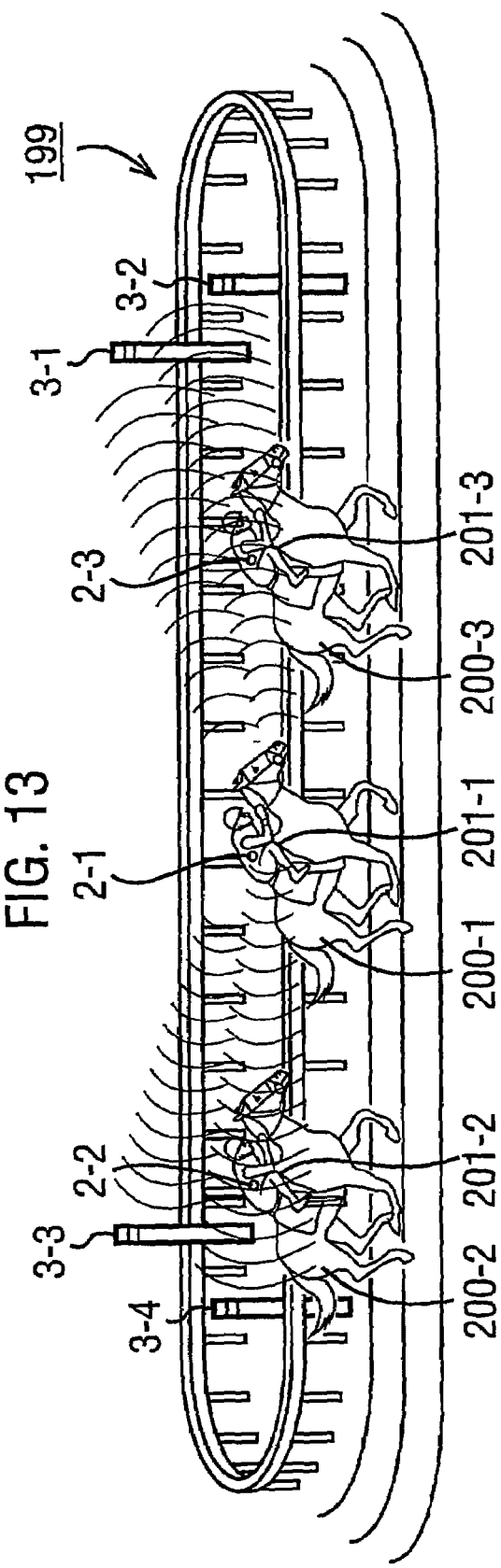
FIG. 13 shows a conceptual arrangement of a number of receivers around a horse-racing track to receive locator chirps transmitted by the mobile tags carried by each horse.

A number of embodiments have been described above which illustrate the way in which the present invention can be used to determine the position of one or more moveable tags relative to a number of receivers. A fourth embodiment will now be described with reference to FIGS. 13 to 17 of a prototype system that has been built for determining and tracking the position of a number of horses around a racing track. FIG. 13 is a schematic diagram illustrating the racing track 199 and showing three horses 200-1, 200-2 and 200-3 with associated riders 201-1, 201-2, 201-3 racing around the racing track 199. Attached to each rider 201 is a tag 2 which is similar to the mobile tag described in the above embodiments. In this embodiment, there are four receivers 3-1, 3-2, 3-3 and 3-4 which receive the chirps transmitted by the mobile tags 2. In this embodiment, there are also two fixed tags (not shown) which are the same as the fixed tags used in the second embodiment and used for the same purpose. FIG. 13 also shows a chirp that is transmitted by tag 2-1. In this embodiment, the tags 2 are arranged to share transmission frequencies but the chirp repetition rate for each tag is different in order to minimise collisions caused by two tags transmitting at the same frequency at the same time. In this embodiment, each chirp also includes a tag ID frequency which is unique and used to ensure that the correct phase measurements are associated with the correct tags.

Tag

Figure 14:
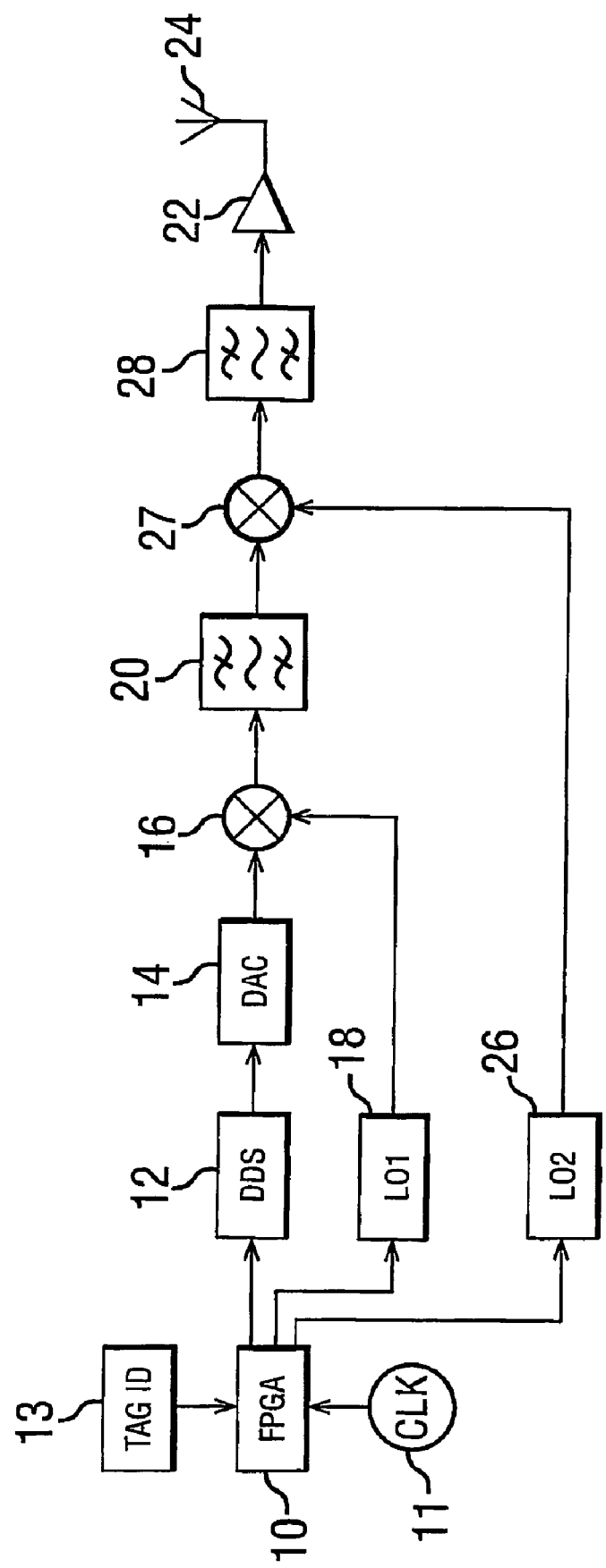
FIG. 14 is a block diagram showing the functional elements of a tag transmitter used in a fourth embodiment.

FIG. 14 is a schematic block diagram illustrating the main functional components of the tags 2 carried by the riders 201. As before, an FPGA 10 receives a clock input (which is in the present embodiment is at 13 MHz) from the clock 11 and provides instructions to a DDS 12 to generate the required tone signals. As will be described below with reference to FIG. 15a in this embodiment, each chirp comprises a predetermined pattern of six different tones. The FPGA 10 also receives data defining a tag ID frequency from the tag ID store 13. This tag ID data defines a unique ID frequency associated with the particular tag 2. This tag ID data is also provided by the FPGA 10 to the DDS 12 so that a tone with the frequency $F_{ID}$ can be generated by the DDS 12. The tones generated by the DDS 12 are generated at a frequency of approximately 70 MHz and require conversion into analogue signals and mixing up to the transmission frequency at approximately 2.45 GHz. In the present embodiment, this is achieved using the DAC 14 and a two-stage mixing process using mixers 16 and 27. In this embodiment, mixer 16 receives a mixing signal from a first local oscillator 18 whose frequency is also controlled by the FPGA 10. The mixer 16 up coverts the tones from the DDS 12 to an intermediate frequency at approximately 450 MHz. The mixed signal is then filtered by the bandpass filter 20 to remove unwanted frequency components of the mixing operation and is then input to the second mixer 27. As shown, the second mixer 27 receives the mixing signal from a second local oscillator 26 whose frequency again is controlled by the FPGA 10. The frequency of the second mixing signal is such as to cause the tones output from the DDS 12 to be mixed up to a frequency of approximately 2.45 GHz. This signal is then filtered by the bandpass filter 28, again to remove unwanted frequency components from the mixing operation. The filtered signal is then amplified by the power amplifier 22 before being transmitted from the transmit antenna 24.

Figure 15A:
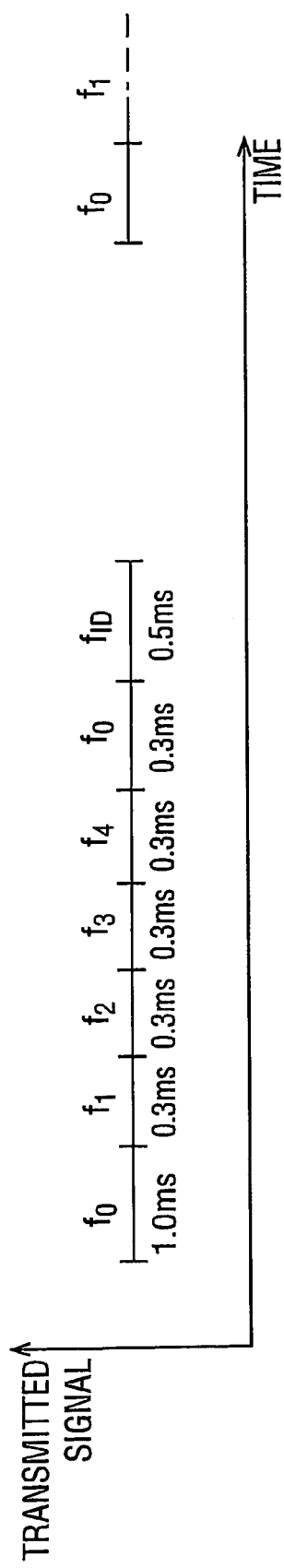
FIGS. 15a and 15b are time plots illustrating the form of signal transmitted by the tag transmitter shown in FIG. 13.

In the first embodiment described above, each chirp included two tones (tone A and tone B). The use of two tones in this way allowed the determination of phase difference measurements which increased the range over which an absolute position measurement could be obtained. As those skilled in the art will appreciate, it is possible to further improve this system by introducing more tones into the chirp so that more tone differences can be calculated. The form of the chirps transmitted by each of the tags 2 in this embodiment will now be described with reference to FIG. 15. In particular, FIG. 15a shows the tone pattern of the chirp, which is a sequence of seven tones. The chirp begins with a tone at frequency $f_0$ which is transmitted for 1 ms. This initial part of the chirp is used a "warm-up" signal and is not used for position calculation. It is there to allow the components in the transmitter and the receiver to warm-up in order to reduce signal degradation in the subsequent tones. Following the transmission of the tone at frequency $f_0$, four tones with frequencies $f_1$, $f_2$, $f_3$ and $f_4$ are transmitted in sequence each for 0.3 ms, followed by another tone at frequency $f_0$ again for 0.3 ms. In this embodiment, these four tones and the second burst of the $f_0$ tone are used for position calculations. Following the second tone at frequency $f_0$, the ID tone (as up converted through the mixers) at a frequency of $f_{ID}$ is transmitted. As mentioned above, the ID frequency is unique for the respective tags 2 which allows the receivers (and/or the position processor) to identify the tag which transmitted the current chirp phase measurements that are being processed.

Figure 15B:
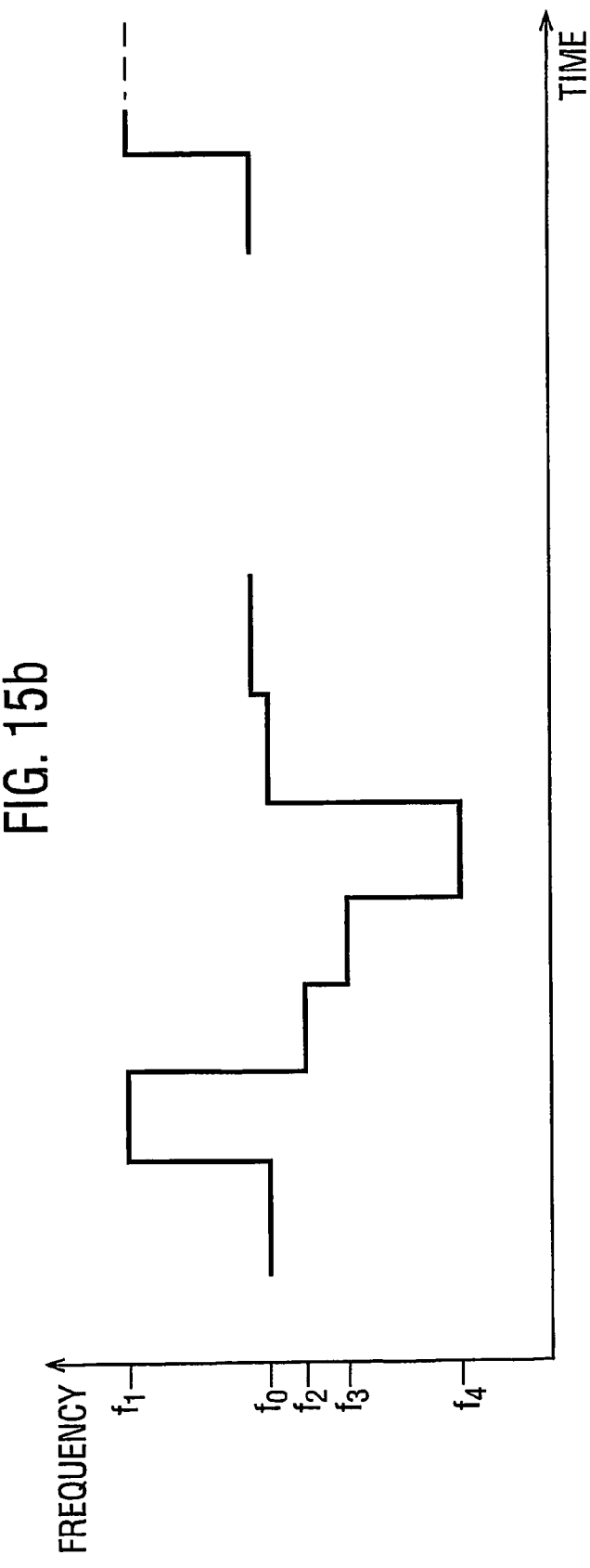

FIG. 15b illustrates the spread of frequencies that are transmitted over the tone. As shown, frequency $f_1$ is higher than $f_0$ and frequencies $f_2$, $f_3$ and $f_4$ are lower than frequency $f_0$ by differing amounts. By considering the tone $f_0$ as a centre frequency around which the others are generated, the exact frequency differences between these tones in this embodiment are:

| Tone | Frequency relative to $f_0$ |
| --- | --- |
| $f_0$ | 0 MHz |
| $f_1$ | +5.12890625 MHz |
| $f_2$ | −0.1015625 MHz |
| $f_3$ | −0.7109375 MHz |
| $f_4$ | −4.82421875 MHz |
| $f_{ID}$ | unique for each tag |

$f_{ID}$ is generated in the present embodiment to be $f_0$ plus or minus 0 to 32 times 101.5625 kHz, yielding a maximum of 65 tags. It should be noted that all of the frequencies $f_1$ to $f_4$ and $f_{ID}$ are integer multiples of 50.78125 kHz which is used as a base frequency in the tags 2 and the receivers 3. As mentioned above, the chirp repetition intervals for each of the tags are different but are all approximately 100 ms. The exact repetition rates are chosen to ensure that each chirp starts from the zero phase point of the 50.78125 kHz basic reference frequency discussed above. This basic reference frequency represents the granularity of the frequency spacing for the tones within the chirp and is the basic "bin width" of the FFT used in the DSP 42 of the receiver 3 for extracting the tone phases. The 50.78125 kHz base frequency is generated as 1/256 of the 13 MHz clock oscillator frequency.

These frequency spacings allow the calculation of the following frequency differences between the tones: one difference of approximately 0.1 MHz ($f_0-f_2$), two differences of approximately 0.7 MHz ($f_2-f_3=0.6$ MHz and $f_0-f_3=0.7$ MHz) and five differences of approximately 5 MHz ($f_1-f_0=5.1$ MHz, $f_1-f_2=5.2$ MHz, $f_0-f_4=4.8$ MHz, $f_2-f_4=4.7$ MHz and $f_3-f_4=4.1$ MHz). These phase differences allow a coarse position measurement to be calculated using the 0.1 MHz phase difference measurements (which corresponds to a maximum unambiguous distance of approximately 3000 m), an intermediate position measurement to be calculated using the 0.7 MHz phase difference measurements (which correspond to a maximum unambiguous distance of approximately 430 m) and a fine position measurement to be calculated using the 5 MHz phase difference measurements (which corresponds to a maximum unambiguous distance approximately 60 m). Referring to FIG. 16, in the present embodiment, the position processor operates initially using only the 0.1 MHz difference signal (illustrated in FIG. 16a) to obtain a coarse position measurement. It then uses this coarse position measurement to identify the correct phase cycle of the 0.7 MHz difference signal (illustrated in FIG. 16b) from which a medium accuracy measurement is determined. Finally, it uses this medium accuracy measurement to identify the correct phase cycle of the 5 MHz difference signal (illustrated in FIG. 16c) from which a fine position measurement is determined.

Receiver

Figure 17:
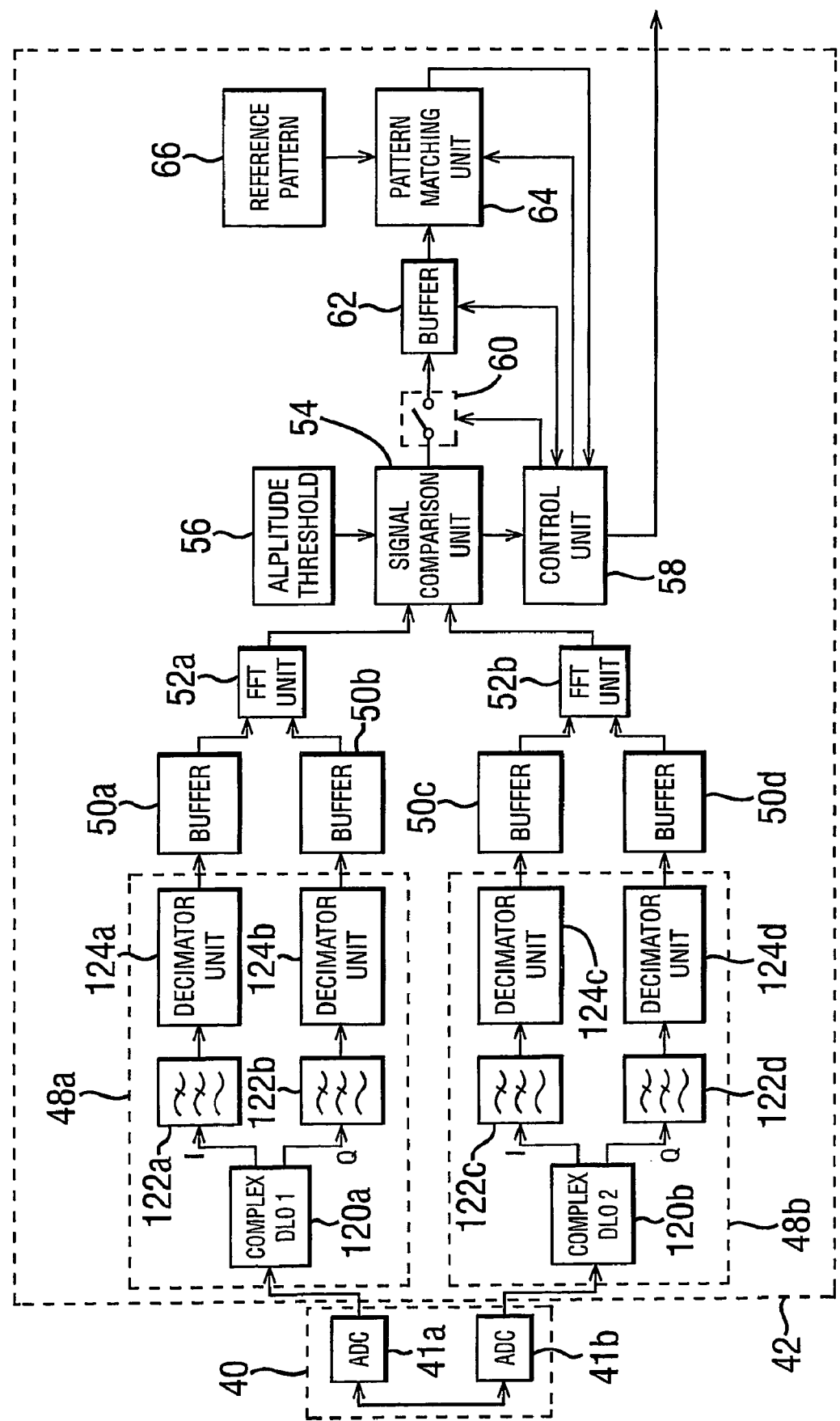
FIG. 17 is a block diagram showing the functional elements of a digital signal processor which forms part of the receiver of the fourth embodiment.

The receivers 3 used in this embodiment are substantially the same as those used in the second embodiment described above. However, there are some differences in the structure of the analogue to digital converter and the digital signal processor that are used. These differences are mainly designed to ensure that the system can be operated using a Pentium III PC compatible computer. FIG. 17 is a schematic block diagram illustrating the main components of the ADC 40 and the DSP 42 used in this embodiment. As shown, the ADC 40 comprises two identical 12 bit ADCs 41a and 41b each of which receive the same input signal from the filter 38 (see FIG. 5). As in the second embodiment, each of the ADCs 41a and 41b is configured to undersample the signal at 52 megasamples per second. This produces a signal image centred at 18 MHz. The output from the ADC 41a is passed to DSP 42 where it is fed to a first mixing and decimation unit 48a and the output from ADC 41b is passed to the DSP 42 where it is fed to a second mixing and decimation unit 48b. As shown in FIG. 17, the data stream from ADC 41a is passed first into a complex digital local oscillator (DLO) 120a which, in this embodiment, mixes the data stream with a 15.4609375 MHz mixing signal. As it is a complex DLO, the output from the DLO 120a comprises both in phase (I) and quadrature phase (Q) samples. Each of the (I) and (Q) sample streams are then low pass filtered by a respective low pass filter 122a and 122b which have a 1 dB cut-off frequency of 5.2 MHz. The filtered I and Q data streams are then decimated by eight down to a sample rate of 6.5 megasamples per second by the respective decimator units 124a and 124b. The outputs of these decimators, which form the output from the mixing and decimation unit 48a, are then passed into a respective buffer 50a and 50b. Blocks of both the in-phase and quadrature phase samples from these buffers are then input to an FFT unit 52a which performs a complex FFT in the manner described above in the second embodiment. In this embodiment, however, the FFT unit 52a performs a 128 point complex FFT rather than a 256 point FFT.

The digital samples output from the ADC 41b are passed to a complex digital local oscillator 120b which, in this embodiment, mixes the data stream with a 20.5390625 MHz mixing signal. The output in-phase and quadrature phase data streams are then low pass filtered by a respective low pass filter 122c and 122d, both of which have a 1 dB cut-off frequency of 5.2 MHz. The filtered I and Q data streams are then decimated by eight down to a sample rate of 6.5 megasamples per second by the decimator units 124c and 124d. The outputs from these decimators are then input to a respective buffer 50c and 50d. Again, blocks of 128 in-phase and quadrature phase samples from these buffers are then input to an FFT unit 52b which performs a 128 point complex FFT on the samples in the block.

Figure 18:
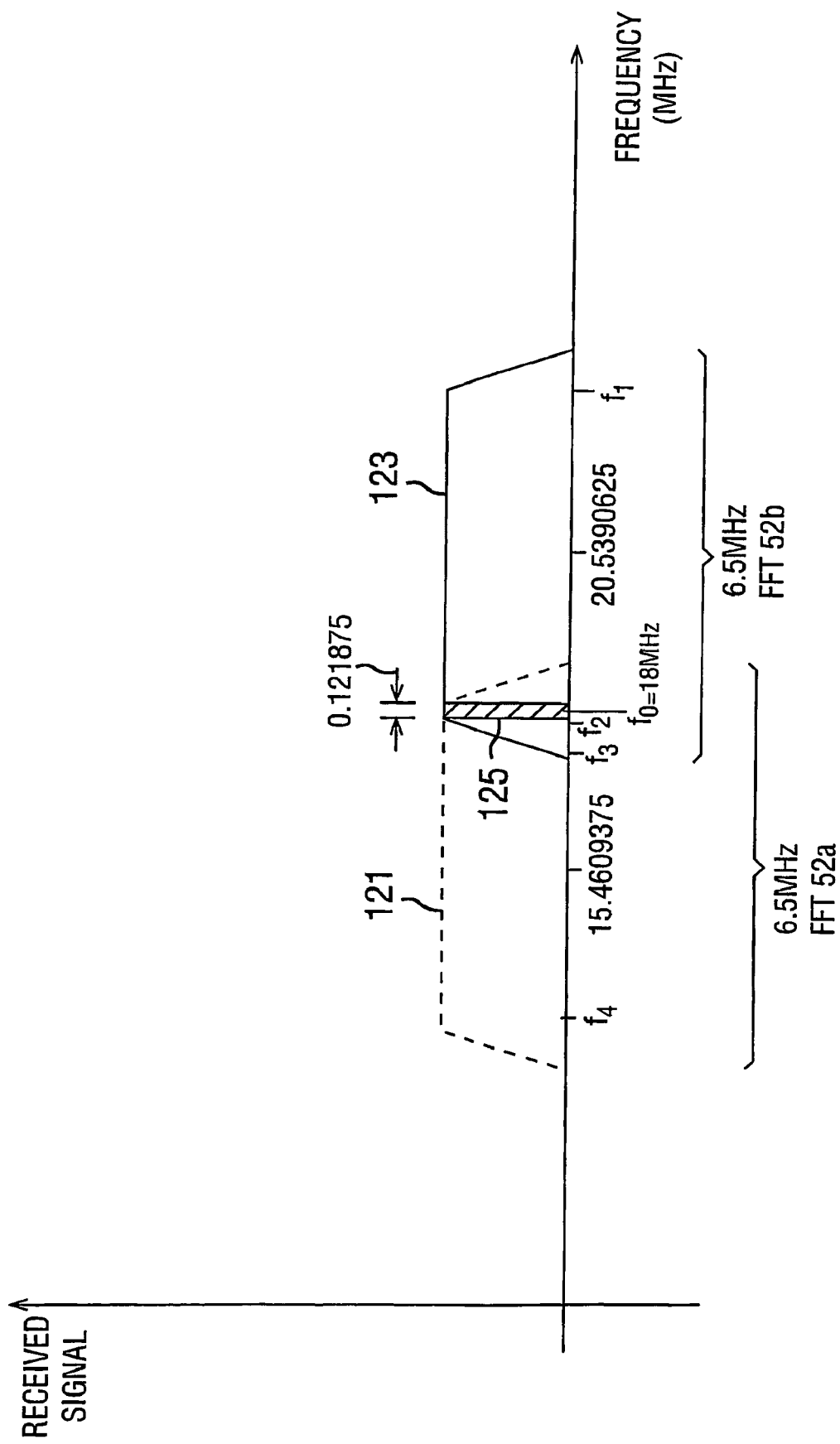
FIG. 18 is a frequency plot illustrating two parts of the received signal's spectrum that are processed by respective processing channels which form part of the digital signal processor shown in FIG. 17.

As those skilled in the art will appreciate, by mixing the samples with different mixing frequencies by the DLOs 120a and 120b, different parts of the spectrum of the received signal are evaluated by the two channels. With the sample rates used and the number of points considered in the FFT, this means that each frequency bin of the FFT outputs represents 50.78125 kHz of frequency spectrum, with the entire FFT output from the FFT unit 52a representing the lower 6.5 MHz of the received signal spectrum and the output of the FFT unit 52b representing the upper 6.5 MHz of the received signal spectrum. The parts of the spectrum that are processed by the two channels are illustrated in FIG. 18. The dashed plot 121 illustrates the part of the signal spectrum that is analysed by the FFT unit 52a and the plot 123 illustrates the part of the signal spectrum that is analysed by the FFT unit 52b. The sloping off of the ends of these plots illustrate the effects of the cut-off rate of the low-pass filters 122 used in the respective channels. As illustrated by the hatched area 125, there is an overlap region centred at 18 MHz (which corresponds to the $f_0$ frequency tone). The location of the other tone signals within the chirp are also shown in FIG. 18 for information. In this embodiment, the mixing frequencies have been chosen so that the frequency bins match in the overlap region 125 so that they can be merged together into a single FFT array spanning the desired range of frequencies for the tag chirp. The result is similar to what would have been achieved using a single processing channel operating at 13 megasamples per second and using an FFT unit that carries out a 256 point FFT.

As shown in FIG. 17, the output from the FFT units 52a and 52b are input to the signal comparison unit 54 where the amplitude values of the FFTs are compared with the amplitude threshold 56 in order to detect the beginning of a chirp. In this embodiment, this is done by detecting the presence of a signal in the FFT output which corresponds to the $f_0$ frequency tone which is transmitted at the beginning of each chirp. When the beginning of a chirp is detected in this way, the amplitude signals in each FFT frequency bin corresponding with known tone frequencies are used to construct a matrix having 5 rows (one for each tone frequency) and 180 columns (for 180 consecutive FFT outputs, which corresponds to approximately 3.5 ms of received signal) which is sufficient to span an entire chirp. The pattern matching unit 64 then compares this pattern of FFT values stored in the buffer 62 with the reference pattern 66 which represents an ideal chirp response. This ideal chirp response is similar to the tone pattern shown in FIG. 15b. However it is not exactly the same since, in this embodiment, the frequency of tone $f_0$ lies within the overlap region 125 of the two FFTs. Therefore, when tone $f_0$ is being transmitted, the output from both of the FFT units 52a and 52b will include amplitude and phase values corresponding to that tone. Further, as shown in FIG. 18, tone $f_2$ lies just outside the region 125 and will not be significantly attenuated by the low pass filters 122. Therefore, tone $f_2$ will also be represented in the output from both FFT units 52a and 52b. However, this is easily represented within the reference pattern and does not pose a problem to the pattern matching unit 64.

In this embodiment, the pattern matching unit 64 compares the pattern of FFT values stored in the buffer 62 by cross-correlating the reference pattern with the data in the buffer 62. This identifies the time offset of the chirp within the sample set, and this time offset is used to determine the time base for the chirp in terms of the receiver's clock. This time offset is also used to determine the optimum time slots for the presence of each tone within the data in the buffer 62. Once a chirp has been identified within the data stored in the buffer 62, the control unit 58 determines the tag ID from the received $f_{ID}$ frequency and extracts an amplitude measurement, a phase offset measurement and a phase slope measurement for the other tones in the chirp. Further, in this embodiment, the control unit 58 determines two sets of amplitude, phase offset and phase slope measurements for the $f_0$ tone, one from the data received from each of the two FFT units 52a and 52b. This is possible, since the $f_0$ frequency appears in the spectrum of the received signal which corresponds to the usable overlap region 125 from the outputs of the FFT units 52. Similarly, two sets of measurements could have been obtained for the $f_2$ tone. However, this was not done in this embodiment.

These amplitude, phase offset and phase slope measurements are then transmitted from the receiver to the position processor together with data identifying the receiver ID, the receiver time for the chirp and the tag ID. As in the embodiments described above, this message is transmitted via a wireless network to the position processor 4 as soon as it has been calculated.

In this embodiment, each receiver 3 is arranged to operate in three different modes, with the mode being selected by the receiver according to the circumstances at that time. The three modes are a scan mode, a collect mode, and a refresh mode.

In the scan mode, the output from one of the FFT units 52 is processed by the signal comparison unit 54. In this embodiment, this processing involves checking the frequency bin of the FFT output corresponding to the $f_0$ frequency for the presence of a signal. This is determined by comparing the amplitude value for the corresponding FFT bin against the fixed threshold which needs to be exceeded for a predetermined number (in this embodiment 5) of consecutive FFT outputs. When this occurs, the receiver is switched to the collect mode.

In the collect mode, the second processing channel is activated so that both channels are working in parallel to process the received data as described above with reference to FIGS. 17 and 18. During the collect mode, the frequency bins for the relevant tones are stacked into the buffer 62. As discussed above, this continues for 180 FFT outputs (corresponding to approximately 3.5 milliseconds of transmitted signal) which is enough to capture all of the transmitted chirp. This data is then processed to extract the amplitude, phase offset and phase slope values as discussed above and then the operating mode of the receiver is switched to the refresh mode.

In the refresh mode, the receiver operates in exactly the same way as in the scan mode except that it is waiting for the absence of the signal at the $f_0$ frequency, at which point it returns to the scan mode discussed above.

Position Processor

The operation of the position processor 4 used in this embodiment will now be described with reference to FIGS. 19 and 20. The data received from each receiver 3 is received by the data receiver 70 and passed to the measurement alignment unit 72 as before. The received data is also stored in a data store 71 for subsequent retrieval and processing. Storing the data in this way allows the system to reprocess the data off-line which can be used to debug the system and for comparative testing for algorithm development. In the measurement alignment unit 72, the incoming data packets, each containing the data of a single tag chirp from one receiver, are queued in a first in, time sequenced out queue. The time sequencing is based on the receiver time tags appended to the chirp data. Since each receiver has its own asynchronous clock, these time tags are referenced to the position processor's clock using a clock difference derived statistically from a large number of received packets. This statistically derived clock offset is not used in the position processing algorithms but it is needed to determine the association between chirps received at the different receivers. It only needs to have an error smaller than half the minimum chirp interval which in this embodiment is approximately 46 ms. The chirps are then drawn out from this queue in time sequence and passed to a quality assessment (QA) and collision detection unit 73 via a set of chirp smoothing filters (not shown).

The chirp smoothing filters are used to smooth out variations in the determined phase slope measurements for each of the tones. A respective smoothing filter is provided to smooth the chirp data from each receiver for each tone from each tag. Therefore, in this embodiment, there are a hundred (5 tones×4 receivers×5 tags) chirp smoothing filters. Smoothing is done since the phase slope measurements for a tone should not change significantly from one chirp to the next. Therefore, in this embodiment, each chirp smoothing filter performs a running average calculation over a predetermined length of time on the corresponding phase slope measurements. In this embodiment, the chirp smoothing filters associated with the fixed tags 5 carry out a running average over approximately one hundred seconds worth of chirps and the chirp smoothing filters associated with the mobile tags carry out a running average over approximately ten seconds worth of chirps. The smoothed phase slope measurements output from these chirp smoothing filters are then used in the subsequent analysis.

The QA and collision detection unit 73 operates to identify collisions (ie when two tags are transmitting at the same time) and to discard the chirp data when this occurs. In this embodiment, this is done using knowledge about the chirp repetition rates of each tag. In particular, the QA and collision detection unit 73 monitors the chirp repetition rates of each tag and each time a reported chirp is received, the QA and collision detection unit 73 checks whether any two tags were scheduled to transmit at that time. If they are then the data for that chirp is automatically discarded. The chirp data is also subjected to a set of consistency checks that test the amplitude and phase slope measurements for variation from one chirp to the next. In particular, if these values change significantly from one chirp to the next or if the phase slope measurements for a single chirp differ substantially, then again the data for that chirp is discarded. In this embodiment, the QA and collision detection unit 73 also compares the received tag IDs against a list of allowed tags and the received data for the chirp is discarded if the tag ID is not on this list.

The chirp data that is not discarded by the QA and collision detection rate 73 is then passed to the phase measurement determination unit 74 where the following phase subtraction measurements are calculated:

| phase difference measurements | Beat frequency |
| --- | --- |
| $\Delta\phi_0$ | $f_0 - f_2 = 0.1$ MHz (from channel 1 of the ADC) |
| $\Delta\phi_1$ | $f_0 - f_2 = 0.1$ MHz (from channel 2 of the ADC) |
| $\Delta\phi_2$ | $f_2 - f_3 = 0.6$ MHz |
| $\Delta\phi_3$ | $f_0 - f_3 = 0.7$ MHz |
| $\Delta\phi_4$ | $f_1 - f_0 = 5.1$ MHz |
| $\Delta\phi_5$ | $f_1 - f_2 = 5.2$ MHz |
| $\Delta\phi_6$ | $f_0 - f_4 = 4.8$ MHz |
| $\Delta\phi_7$ | $f_2 - f_4 = 4.7$ MHz |
| $\Delta\phi_8$ | $f_3 - f_4 = 4.1$ MHz |

Each phase difference measurement is calculated by referring the two tone phase offsets concerned to the time point between the two tones using the phase slope measurements for the chirp to extrapolate to the common time, and then subtracting them. As in the second embodiment, the phase offset measurement for each tone is taken at a time corresponding to the middle of the tone and this value is extrapolated using the associated phase slope measurement to the point in time midway between the two tones being subtracted. For example, referring to FIG. 15b, in the case of the subtraction the phase measurements for $f_0$ and $f_3$ this time point lies somewhere in the middle of the tone at frequency $f_4$. As mentioned above it is these extrapolated values (which represent what the expected tone's phases would be at the same point in time) that are subtracted. These phase differences are represented as an absolute phase value at the measurement time and a phase slope. This phase slope is initialised by subtracting the two phase slope measurements for the two tones being subtracted and is thereafter maintained by a phase locked loop which tracks the phase difference between chirps. Further, since the difference frequencies may undergo several cycles of phase rotation between chirps (depending on the relative clock frequency offsets between the tag and the receiver), the phase difference measurement is tracked between chirps.

Figure 20:
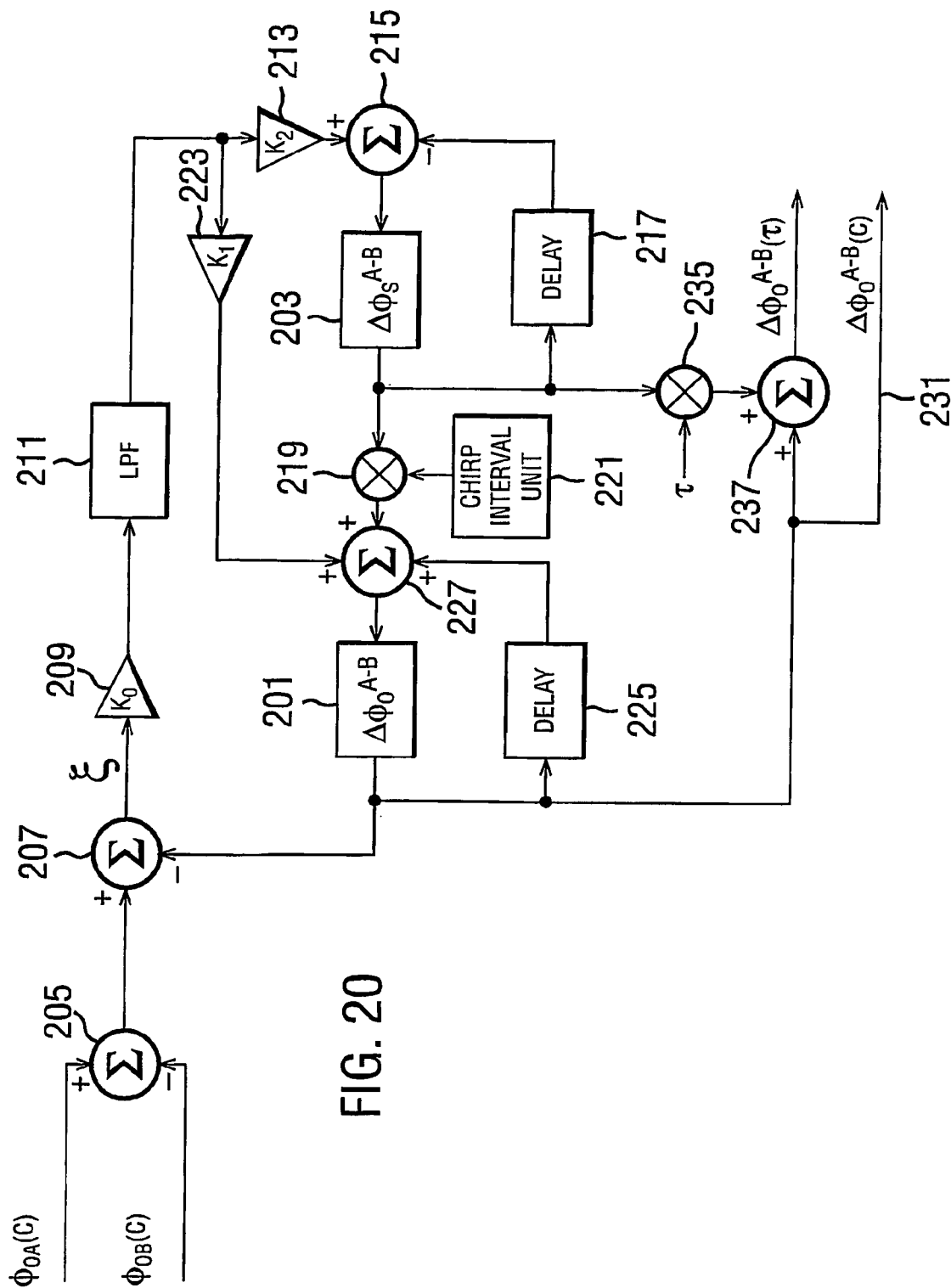
FIG. 20 is a block diagram showing the functional elements of a phase difference tracking loop for tracking the difference in phase in the position processor of the fourth embodiment.

FIG. 20 is a schematic block diagram illustrating the form of the phase difference tracking loop used in this embodiment. The loop is essentially a proportional and integral tracking control loop. The loop maintains estimators of the phase difference offset value ($\Delta\phi_0^{A-B}$) output from block 205 and of the phase difference slope value ($\Delta\phi_s^{A-B}$) output from the block 203. The estimators operate each time data for the corresponding chirp is received and at that time, the estimator values are updated. As shown, upon receipt of new phase offset measurements for the two tones (labelled A and B), these are differenced in the adder 205. The current phase difference offset value from the estimator block 201 is then subtracted from this value in the adder 207 to provide an error value ($\xi$). This error value then passes through the loop gain 209 and the low pass filter 211. The filtered error signal is then used to update the phase difference slope value stored in the block 203. As shown in FIG. 20, it does this by passing the error signal through a second amplifier block 213 and then subtracting from this value, in the adder 215, the value of the previous phase difference slope value provided by the delay unit 217.

This new phase difference slope value is then used to update the phase difference offset value stored in the block 201. It does this firstly by multiplying the new phase difference slope value in the multiplier 219 with the time between the last chirp and the current chirp, which is provided by the chirp interval unit 221. This value is then added together with a further amplified version of the error signal output from the amplifier 223 and the previous value of the phase difference offset value provided via the delay unit 225. As shown, these values are added in the adder 227. This new value of the phase difference offset value is then stored in the block 201 for use at the next chirp time.

As shown in FIG. 20, this new phase offset value is also output on the line 231 for use in the position calculation algorithms discussed in more detail below. Once this loop has locked onto the signals, it can also be used to provide an estimate of the phase difference offset at an arbitrary time ($\tau$) and not just at the chirp times. As shown, this is achieved by multiplying the current estimate of the phase difference slope value obtained from block 203 with the time ($\tau$) in the multiplier 235 and then by adding this to the current estimate of the phase difference offset value output from the block 201 in the adder 237.

As those skilled in the art will appreciate, a separate phase locked loop (PLL) is provided for each phase difference measurement that is calculated, for each tag and for each receiver. Therefore, in this embodiment, with nine phase differences, three mobile tags, two fixed tags and four receivers, this means there are 180 phase locked loops like the one shown in FIG. 20.

System Calibration

As mentioned above, the receivers 3 operate independently of each other and they each have their own unsynchronised clock. As in the second and third embodiments described above, the position processor 4 uses the phase difference measurements obtained from the fixed receivers to reference the phase measurements from the mobile tags 2 back to a single reference clock. In this embodiment, each fixed tag and each measured phase difference for a mobile tag is treated independently so that, in this embodiment, there are two independent reference clocks and different phase measurements associated with each.

For each fixed tag (M) and each phase difference (P) a set of $\phi^{MRP}(t)$ values is obtained from the corresponding phase difference tracking loops. Since the positions of the fixed tags and the receivers 3 are known the phase rotation caused by the signal propagation paths between the fixed tags and the receivers can be subtracted from these phase difference measurements. This results in a set of modified $\phi'^{MRP}$ values for the fixed tags M, receivers R and phase differences P, as though the fixed tags were located at each receiver. By subtracting these phase values from the corresponding phase differences measured from a mobile tag, a phase measurement relative to the fixed tag is derived thereby eliminating the clock effects of the receivers. Again, the phase of each of these modified $\phi'^{MRP}$ values is tracked using a separate phase lock loop (not shown) in order to estimate their most likely values at the time of the current position computation for a mobile tag.

Position Calculation

Figure 19:
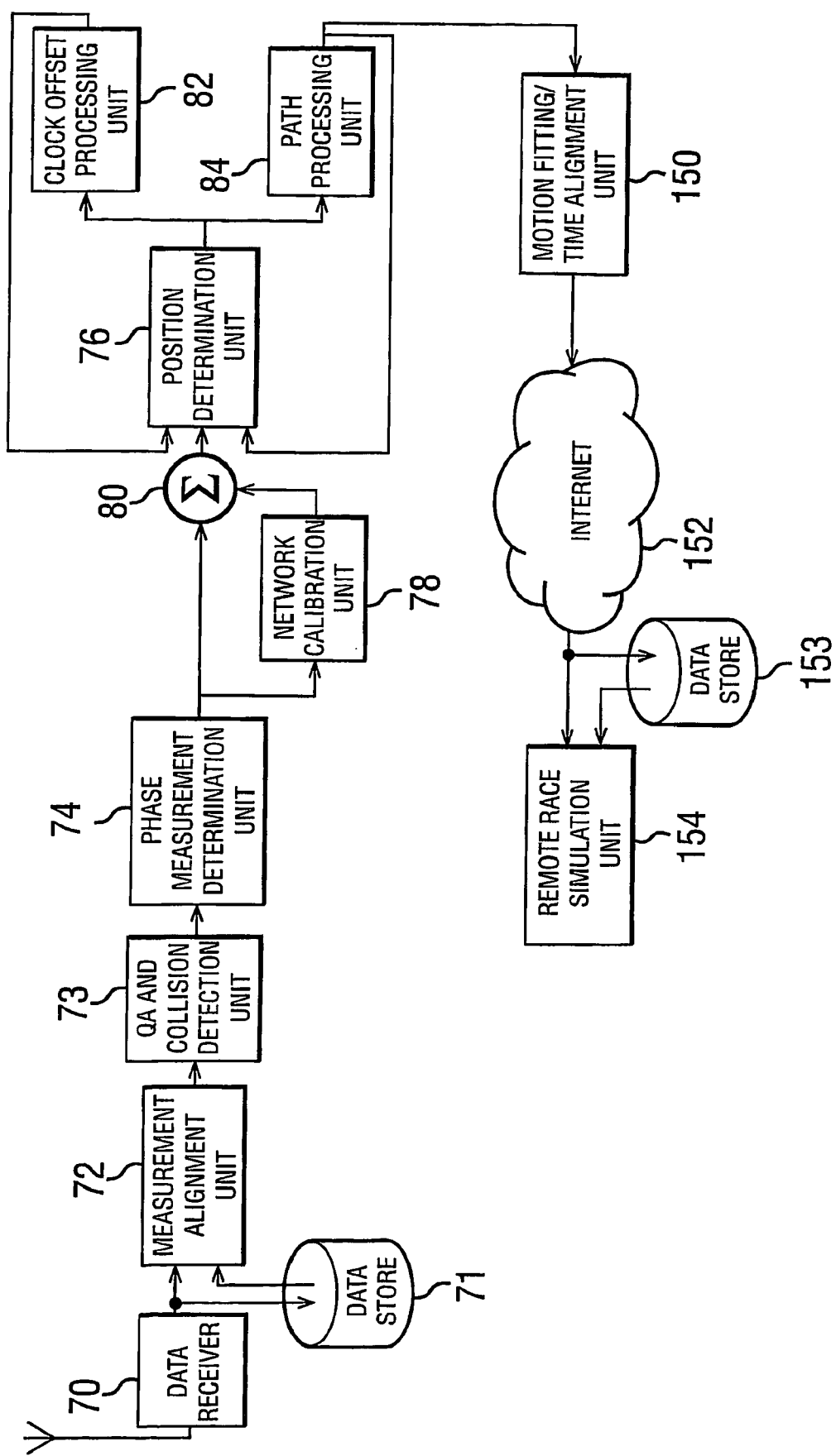
FIG. 19 is a block diagram showing the functional elements of the position processor of the fourth embodiment.

In this embodiment, the position calculation is performed in a similar manner to the way in which it was performed in the second embodiment described above except using the phase difference values output from the phase difference tracking loops (one of which is shown in FIG. 19). Equation 18 given above for F is for a single fixed tag, one phase difference measurement and one mobile tag. Extending it to M fixed tags and P phase difference measurements results in the following function:

$$F(d_x, d_y, \phi_{TF_{pm}}, t) = \sum_{m=1}^{M} \sum_{p=1}^{P} \sum_{i=1}^{R} k_{pm} f_{ipm}^2(t) \qquad (19)$$

The value $k_{pm}$ is a weighting factor that allows the different partial sums for different phase measurements and/or fixed tags to be weighted. For example, phase differences corresponding to longer wavelengths may be weighted lower than those associated with the shorter wavelengths, in order to balance the error each contributes. Again, this function can be solved numerically to find best estimates of the values that minimise F given the received measurements.

In this embodiment, there are two fixed tags, three mobile tags, four receivers and nine phase difference measurements being measured. Therefore, this results in 180 ((2+3)×9×4) individual phase difference measurements. For each mobile tag a set of 72 (2×4×9) phase difference measurements are obtained and there are 18 unknowns–16 unknown clock offsets ($\phi_{TF_{pm}}$) and a two dimensional position. This set of equations therefore contains significant redundancy (more equations than unknowns). However, using additional fixed tags and phase difference measurements has been shown to yield significantly improved robustness and accuracy through spatial diversity, frequency and time diversity and statistical averaging of measurement noise.

Resolving Cyclic Ambiguity

In any phase measuring system there is a cyclic ambiguity that can result in a displacement error of integer multiples of wavelengths. In this embodiment, the short wavelength difference signals are around 5 MHz which corresponds to a wavelength of approximately 60 metres, which means that there is scope of many cycles of ambiguity in the measurement. For this reason, the longer wavelengths are used to resolve the cycle ambiguities. In principle, the long wavelength is used to produce an unambiguous position within the area of coverage and having an error small enough to initialise the medium wavelengths. These produce a more accurate position in the region of the long wavelength estimate and accurate enough to initialise the short wavelengths. The algorithm is then run using the short wavelengths to determine a highly accurate position fix.

Once a position fix has been obtained using the short wavelengths, this position is used to determine an estimate for the position calculation at the next chirp measurement, without having to restart the sequence through the long and medium wavelength steps. Referring to FIG. 18, the clock offset processing unit 82 and the path processing unit 84 are used to provide these estimates for the position calculation for the next chirp. These operate in the same way as the corresponding components in the third embodiment described above.

Once the position processor 4 is in the tracking mode, it still continuously calculates the positions using the long and medium wavelength measurements as well. The output from the position processor 4 is taken from the short wavelength measurements, unless it is indicated as being invalid. In particular, the position measurements output for the different wavelength measurements are continually compared in order to sense gross errors. If an error occurs, then the position determination unit will detect this and correct for it by discarding the position from the shorter wavelength measurements.

Even when operating in the tracking mode it is still possible, for example because of fast motion of the tags, for there to be an error in the cycle count for one or more of the phase difference measurements. Therefore, in this embodiment, the position processor 4 performs a series of tests and iterations before arriving at the "best" position solution. In particular, the position processor 4 performs the following processing steps for each positioning update using the short wavelength measurements:

(i) Construct a matrix of R×M×P measurements from the measured phase differences plus the calibration phase differences (where R is the number of receivers, M is the number of fixed tags and P is the number of phase difference measurements corresponding to the short wavelengths (which in this embodiment is 5)).

(ii) Feed each of the R×M×P measurements through a respective phase locked loop (similar to the PLL shown in FIG. 20), the output of which is a smoothed "phase estimator" which is used in the position calculation.

(iii) Feed the set of M×P network phases ($\phi_{TFmp}$) through a respective phase locked loop (again similar to the PLL shown in FIG. 20), the outputs of which are used to estimate their most likely values at the time of the current position computation.

(iv) Based on the last known position for the tag, and hence the path distances in wavelengths between the tag and each receiver, the estimated network phases ($\phi_{TFpm}$) and the measured phases, determine a matrix of R×M×P cycle counts.

(v) Run the minimisation algorithm to derive the best fit position ($d_x$, $d_y$) and network phases ($\phi_{TFpm}$) as well as the overall function value of function F; and determine a matrix of error residuals representing the error contribution of all of the individual $f_{ipm}$ equations.

(vi) Using the values of $d_x$, $d_y$ and $\phi_{TFpm}$ obtained from step (v), calculate new range phases and a new matrix of cycle counts. (The range phase is the phase value that is measured corresponding to the distance between the receiver and the tag ignoring the cycle count. In particular, given a signal of wavelength λ and distance between the receiver and the tag of d, the phase comprises the cycle count which is the integer part of d/λ and the range phase which is the fractional part of d/λ).

(vii) Return to step (v) until the obtained function value for function F is equal to or greater than the previous value at which point further minimisation is not being achieved.

(viii) Examine the individual error residuals matrix (i.e. the individual values of $f_{ipm}$) to find the largest residual error and increment or decrement the cycle count corresponding to that measurement set depending on the sign of the error.

(ix) Return to step (v) until the obtained function value for function F is equal to or greater than the previous value at which point no further minimisation is being achieved.

(x) Disable the measurement set corresponding with the worst remaining residual error and then return to step (v) a small (configurable) number of times, to eliminate the worst few phase paths from the position calculation.

The output of this process is then used in this embodiment as the "best" estimate of the mobile tag position and the network phase values for the set of measurements.

Initialisation

The position processor 4 goes through a series of stages from the initial start up to full tracking mode. In this embodiment, these various stages are controlled by interlocking state machines running for each tag and for the system state as whole.

The first state machine is for system start up and calibration. It runs independent processing calculations for each fixed tag and reaches the final system calibrated stage only when the required number of fixed tags have reached this state. The processing for each fixed tag is as follows:

(i) Determine the initial chirp phase offset and slope values by direct measurement.

(ii) Allow the chirp smoothing filter (used to smooth the phase slope measurements) to settle.

(iii) Initialise the chirp phase difference tracking PLLs (shown in FIG. 20).

(iv) Allow the chirp phase difference tracking PLLs to settle.

(v) Wait for a required number of receivers to acquire lock then set the tag synchronisation flag.

(vi) Wait for the required number of fixed tags to signal synchronisation before moving to step (vii).

(vii) Set the system calibrated status once time synchronisation has been achieved.

The system start up state machine takes several minutes to initialise. This allows time for the receivers to stabilise and for statistical time synchronisation of the receivers to be achieved. Also the filter and phase locked loop time constants for the fixed tags are normally quite long compared to those for the mobile tags.

The second state machine is for mobile tag initialisation and position processing. This operates as follows:

(i) Initialise the phase offset and slope values by direct measurement.

(ii) Allow the chirp smoothing filter to settle.

(iii) Initialise the chirp phase difference tracking PLLs.

(iv) Allow the chirp phase difference tracking PLLs to settle.

(v) Wait for the required number of receivers to acquire lock.
(vi) Wait for system calibrated status.
(vii). Compute the initial tag position using the longest wavelength inputting the determined position into a position smoothing filter (not shown) associated with the long wavelength and wait for this filter to settle.
(viii) Compute the tag position using the medium wavelength initialised by the position from the long wavelength and feed the results into a medium wavelength position smoothing filter (not shown) and wait for this filter to settle.
(ix) Compute the tag position using the short wavelengths initialised by the position from the medium wavelength. Search the cyclic ambiguities for the best solution. If the function error residual test shows an acceptable solution move to tracking mode.
(x) Track the position using the short wavelengths. Run the medium and long wavelengths in parallel to test for cycle jump error conditions.

The filter and tracking time constants for the mobile tags are quite short and thus it is possible for this state machine to advance all the way to full tracking mode in as little as 10 seconds in this embodiment.

Although the above processes are described as being "one-way", they can be restarted under a number of error conditions. For example, if a chirp from one tag is not received for a predetermined length of time (such as 10 seconds), its state machine can be reset appropriately. Similarly, if the short wavelength is found to be tracking with a cycle offset, the position can be re-initialised starting with the medium or longer wavelengths depending on the severity of the error.

Returning to FIG. 18, the final position determinations determined by the path processing unit 84 are output to a motion fitting/time alignment unit 150. This unit allows tag positions for each of the mobile tags 2 to be calculated for any arbitrary time, rather than the specific time at which the tag transmitted its chirp. It is necessary to time align the position data especially since a galloping horse can cover approximately 1.7 metres between chirps. The smoothing and motion algorithms used by the unit 150 apply a least squares straight line fitting algorithm to the determined x and y positions over the past few seconds worth of data. Time aligned sets of position data for all of the mobile tags 2 are then extracted on a predetermined time base, using the straight line fit parameters. In this embodiment, this position data is then transmitted over the Internet 152 to a remote race simulation unit 154. The data is also stored in a data store 153 so that it can be used subsequently for simulation purposes. In this embodiment, the remote race simulation unit 154 uses a graphical visualisation tool or a 3D game rendering tool which can generate an appropriate simulation of the race from the received position data.

Fifth Embodiment

In the fourth embodiment, all of the tags transmitted on the same frequency but at different times and with the chirp repetition rate of the tags being different in order to minimise the times at which two tags will transmit at one time. However, as those skilled in the art will appreciate, even with this approach, there is a limit to the number of tags that can be operated within a given bandwidth. An embodiment will now be described in which the centre frequency of the transmitted tones (ie the frequency value of tone $f_0$) is varied from one chirp to the next in a predetermined manner. This also allows more tags to be operated within a given bandwidth being processed. In particular, if the centre frequency $f_0$ is frequency hopped in a pseudo random fashion from one chirp to the next, then the probability of two tags transmitting at the same frequency at the same time is very small and therefore a larger number of tags can be tracked.

In such an embodiment, both the mobile tags and the fixed tags would be arranged so that the FPGA 10 is programmed with a known transmit scheme which defines the centre frequency for each chirp transmitted from the tag. Thus the exact values of the frequencies $f_0$ to $f_4$ and $f_{ID}$ will change for each chirp. However, the relationship between each of the tones $f_0$ to $f_4$ and $f_{ID}$ will remain fixed. In the receivers, each receiver will know which frequencies are capable of serving as the centre frequency $f_0$ according to the predetermined transmits schemes that are being used. Therefore, in the scan mode of operation, the receivers will scan all of the possible $f_0$ frequencies simultaneously. The collect mode and the refresh mode for each receiver will then work in the same way as in the fourth embodiment described above. In such an embodiment, the receiver would also transmit data to the position processor 4 which identifies the centre frequency $f_0$ of the received chirp.

Upon receipt of the data from the receivers at the position processor 4, the QA and collision detection unit 73 can monitor for collision detections using the known transmit schemes for each of the tags. In particular, by comparing the transmit scheme for each tag against the transmits schemes of the other tags, based on the recently received chirps for each tag, the QA and collision detection unit 73 can look ahead and predict when collisions can be expected. When the data for these chirps are received they can then be discarded.

The use of such frequency hopping schemes in the tags also reduces the system's susceptibility to narrow band interference. In particular, in the fourth embodiment described above, if there is a source of interference over the transmission frequencies being used, then all of the chirp data is likely to be corrupted by noise. However, by frequency hopping the system's susceptibility to interference is reduced.

Sixth Embodiment

As a further alternative to frequency hopping, each of the tags may be arranged to transmit a spread spectrum signal rather than simple tones. A sixth embodiment will now be described which uses tags which transmits spread spectrum signals.

FIG. 21 is a functional block diagram illustrating the main components of the tag 2 used in this embodiment. As shown, the tag includes a signal generator 90 which receives a clock input from a crystal oscillator (not shown). In response to the clock input, the signal generator 90 generates two tones corresponding to tones A and B of the first three embodiments. The signal generator 90 also generates a control signal which it outputs to a pseudo-random noise (PN) code generator 92. The PN code generator 92 generates a pseudo-noise code which it outputs to a mixer 91 where the code is mixed with the tones A and B to form the spread spectrum signal. The output from the mixer 91 is then passed to a bandpass filter 94 and onto a power amplifier 96 before being passed to a transmitter antenna 98 for transmission from the tag 2. In this embodiment, the frequency of the two tones A and B output from the signal generator 90 are sufficiently high to allow for direct transmission. However, in an alternative embodiment, the output from the mixer may be up converted to the appropriate transmission frequency.

FIG. 22 is a schematic block diagram illustrating the main components of a receiver 3 used in such an embodiment. As shown, the signals transmitted from the tag 2 are received by the receiver antenna 100. The received signals are then amplified by a low noise amplifier 102 and then down converted to an appropriate intermediate frequency in the mixer 104. As shown, the mixer 104 receives the mixing signal from a local oscillator 106 which receives a clock input from a crystal oscillator (not shown). The down converted signal output from the mixer 104 is then passed through a bandpass filter 108 and then into a cross-correlator 110 where the received signal is correlated with a locally generated version of the pseudo-random noise code used by the tag. The cross correlator can determine the received phase of the signal to an accuracy of approximately one quarter of the chip period of the PN code. The determined phase data output by the cross correlator 110 is then passed directly to a data transmitter 114 which packages the data for transmission to the position processor 4. However, with the phase measurement from the correlator, the position processor can only determine the position of the tag to a resolution of approximately 10 metres. Therefore, in this embodiment, the cross correlator 110 also recovers the carrier tones and outputs these to the DSP 112. In this embodiment, the DSP processes these carrier tones in the same way as the tones were processed in the above embodiments. The phase information extracted by the DSP 112 is then passed to the data transmitter 114 for onward transmission to the position processor 4 which operates in a similar way to the position processor described above. The only main difference is that the phase measurement obtained directly from the cross correlator 110 is used to provide a coarse position measurement and the phase measurements from the DSP 112 are used to provide an accurate position measurement.

To distinguish between a plurality of mobile tags 2, the system of the present embodiment allocates separate frequencies for each tag to transmit on. Alternatively, the PN code used in each tag could have been made different although this will complicate the structure of the receivers as each will have to correlate the received signal with a number of different locally generated PN codes. Provided that there is sufficient coding gain, i.e. that the cross-correlation sum between different codes is low enough, the signals from each tag may overlap in frequency without causing interference. It is also possible to frequency hop the system to provide additional robustness to narrow band interference, although spread spectrum systems have a very high inherent noise rejection capability.

Seventh Embodiment

Figure 23:
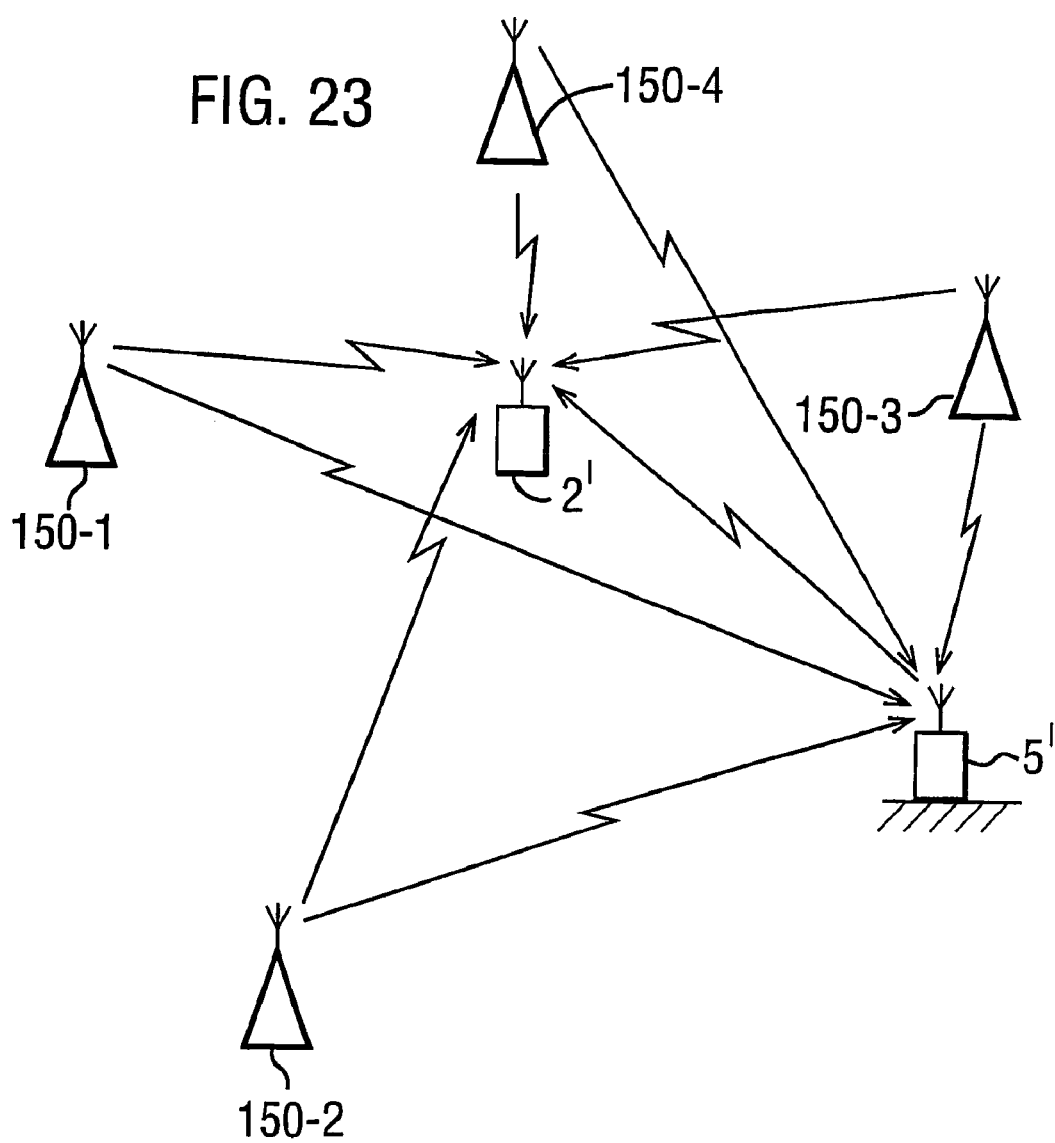
FIG. 23 is a schematic diagram showing a positioning system of a seventh embodiment used for tracking the position of a moving object.

In all of the embodiments described above, the receivers have been fixed and the transmitters have moved relative to the receivers. In this seventh embodiment, the function and operation of the transmitters and receivers are reversed so that the or each tag becomes a receiver and each receiver becomes a transmitter. FIG. 23 illustrates one arrangement of the transmitters (referenced 150-1, 150-2, 150-3 and 150-4) together with a single mobile tag 2' and a fixed tag 5' for calibration as before.

In operation, each of the transmitters 150 broadcasts a multitone signal, which are received by the mobile tag 2' and the fixed tag 5'. In this embodiment, each of the transmitters 150 transmits the same multitone signal but in a time multiplexed manner so that the mobile tag 2' and the fixed tag 5' can differentiate between the emissions of each of the transmitters 150. As those skilled in the art will appreciate, the same result can be achieved if each of the transmitters transmits different frequency tones. However, this requires the mobile tag 2' and the fixed tag 5' to be able to detect and differentiate a larger number of frequencies.

In this embodiment, each of the transmitters 150 is operable to transmit a multitone signal like those used in the fourth embodiment described above, which allows a coarse position measurement calculation to be made from two tones that are closely spaced apart in frequency and to use this as an initial estimate for a fine position measurement using the phase difference of tones which are widely separated in frequency. Each multitone signal also includes an ID tone which identifies the transmitter 150 to the tag, and which obviates the need for a synchronised transmission schedule known by each transmitter 150 and each tag in advance.

In this embodiment, both the mobile tag 2' and the fixed tag 5' include the receiver and position processor circuitry that were used in the fourth embodiment described above and will not be described again.

The fixed tag 5' operates in a similar way to the mobile tag 2' in that it receives the multitone signals from each of the transmitters 150 and it determines a clock-offset between the clock in each transmitter 150 and the clock of the fixed tag 5'. It does this using the measured phase differences and the known positions of the transmitters 150 and of the fixed tag 5' itself. The fixed tag 5' then transmits these clock offsets to the mobile tag 2' which uses them in the manner described above to generate appropriate phase calibration values which it uses to reference its phase measurements back to the clock of the fixed tag 5' (in the same way as in the fourth embodiment described above).

Eighth Embodiment

In the seventh embodiment described above, the mobile tag 2' calculates a fine position measurement using a phase difference between tones that are widely spaced apart in frequency. If the transmission frequency band being used is the 2.4 GHz to 2.4835 GHz, then the maximum separation between the tones is 83.5 MHz. With this separation, a resolution of approximately 4 cm (approximately 1% of the wavelength of the phase difference) can be obtained in the fine position measurement.

In this eighth embodiment, the multi-tone phase difference position calculation technique used in the seventh embodiment is combined with a conventional phase-based position calculation, such as the phase-based position calculation described in U.S. Pat. No. 3,889,264 (the contents of which are incorporated herein by reference). In this conventional phase-based position calculation system, the fixed transmitters 150 transmit a single tone to the mobile tag 2' which then measures the phase difference between the tone received from one transmitter 150 and the tone received from another transmitter 150, for each transmitter 150 combination, and then uses these phase differences plus the known location of the transmitters 150 to calculate a fix on its location using a hyperbolic algorithm. A minimum of three transmitters 150 are required if the transmitters are synchronised with the clock in the mobile tag 2', otherwise four transmitters are required to resolve for the clock ambiguity. Extra transmitters can also be provided which allows various minimisation techniques (such as those described earlier) to be used which improves reliability of the final position measurement.

As discussed in the introduction, one of the problems with this type of conventional phase-based positioning system is that when the transmitters transmit relatively high frequency tones absolute position measurement can only be provided over a very limited range because of the above-described phase ambiguity problem. In this embodiment, this problem is overcome by using the position measurement obtained using the technique described in the seventh embodiment as an initial estimate of the position to be calculated using the conventional phase-based positioning technique.

In this embodiment, these two phase-based position calculation techniques are combined without significant increase in the overall complexity of the transmitters 150 and the tags. This is because it is not essential for the transmitters 150 to transmit additional tones for use in carrying out the conventional phase-based position calculation. All that is required is that the tags (or some other position processor) include additional processing circuitry for carrying out the conventional phase-based position calculations.

Figure 24:
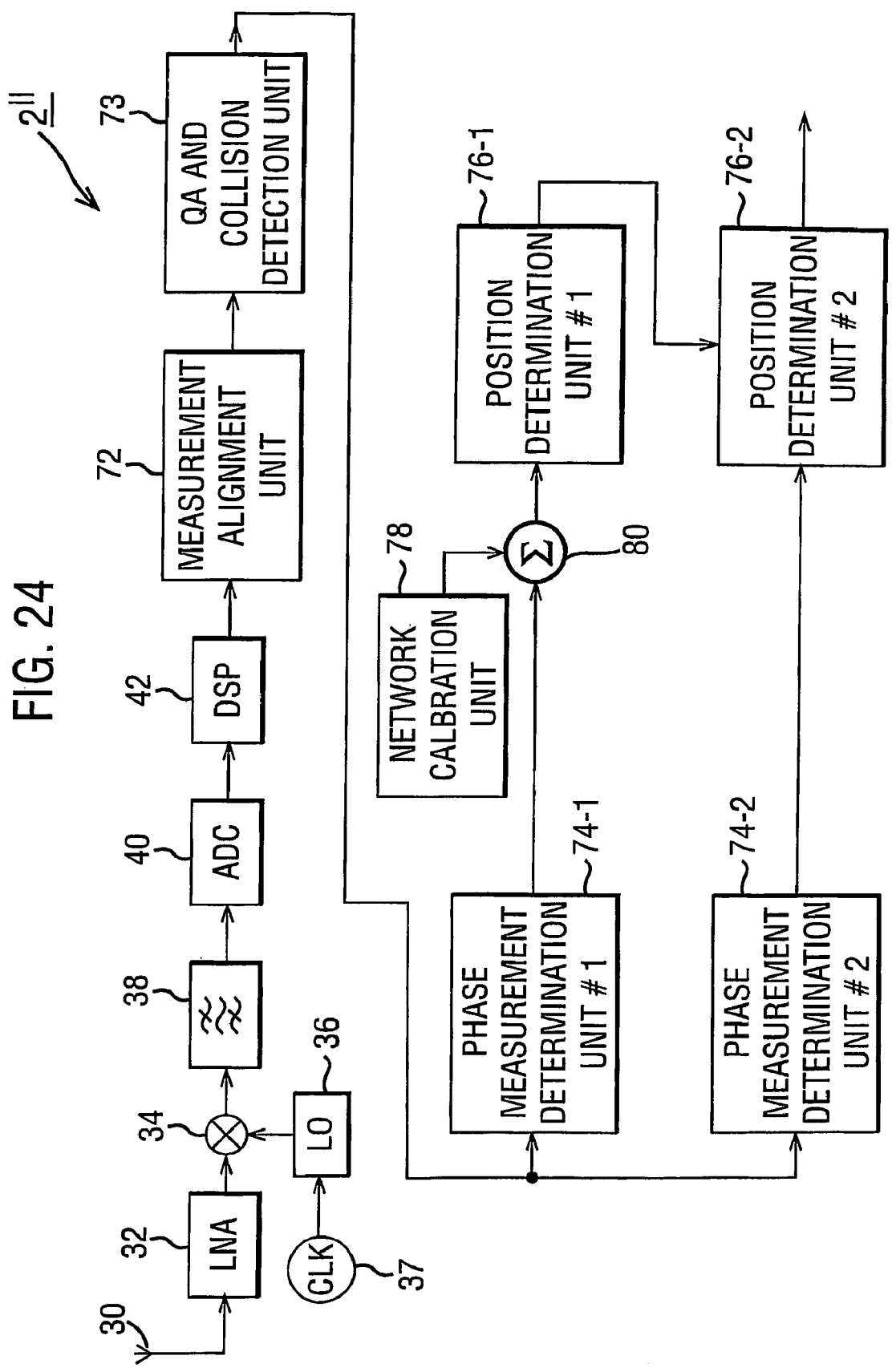
FIG. 24 is a block diagram showing the functional elements of receiver circuitry and position calculation circuitry forming part of a mobile tag used in an eighth embodiment.

FIG. 24 is a schematic block diagram illustrating the main components of the mobile tag 2" used in this embodiment. The arrangement of the fixed tag 5' is the same as used in the seventh embodiment and will not be described again. The transmitters 150 used in this embodiment transmit similar chirps to those transmitted by the mobile tag in the fourth embodiment. The main difference is that the transmitted chirps include tones that are at each end of the 2.4 GHz to 2.4835 GHz transmission band being used. As discussed above, a position measurement at a resolution of approximately 4 cm can then be obtained from the phase difference between these tones. This position measurement can then be used as the initial estimate for the conventional phase-based position calculations. In this embodiment, the mobile tag 2" includes all of the circuitry provided in the receivers 3 and the position processor 4 of the fourth embodiment described above. The same reference numerals have been used to reference the same processing components. As shown in FIG. 24, the phase measurements output from the QA and collision detection unit 73 are passed to two phase measurement determination units 74-1 and 74-2. The first phase measurement determination unit 74-1 is the same as the phase measurement determination unit 74 used in the fourth embodiment described above. The phase difference measurements output by the phase measurement determination unit 74-1 are output to an adder 80 where they are added with the appropriate network calibration phase output from the network calibration unit 78. As discussed above, these calibration values are determined from the timing offset data received from the fixed tag 5' over a separate data channel (not shown). The network calibrated phase measurements are then passed to a first position determination unit 76-1 which performs the same position calculations performed by the position determination unit 76 used in the fourth embodiment described above.

In this embodiment, the second phase measurement determination unit 74-2 calculates phase difference measurements for the same tones transmitted from different transmitters 150. In particular, in this embodiment, the second phase measurement determination unit 74-2 calculates the following phase difference measurements:

| Phase difference measurements | Beat frequency |
|---|---|
| $\Delta\phi_9$ | $f_1^{T1} - f_1^{T2}$ |
| $\Delta\phi_{10}$ | $f_1^{T1} - f_1^{T3}$ |
| $\Delta\phi_{11}$ | $f_1^{T1} - f_1^{T4}$ |
| $\Delta\phi_{12}$ | $f_1^{T2} - f_1^{T3}$ |
| $\Delta\phi_{13}$ | $f_1^{T2} - f_1^{T4}$ |
| $\Delta\phi_{14}$ | $f_1^{T3} - f_1^{T4}$ | where $f_1^{Ti}$ is the phase measurement for the received tone at frequency $f_1$ that was transmitted from transmitter Ti. Before calculating a phase difference measurement, the second phase measurement determination unit 74-2 refers the two-tone phase offsets concerned to a common time point using the phase slope measurement determined for the corresponding chirps.

As shown in the above table, in this embodiment, the second phase measurement determination unit 74-2 only uses the $f_1$ tones transmitted by the transmitters 150. The $f_1$ frequency tones were used since this is the highest frequency tone that is transmitted by the transmitters 150, and therefore this will provide the most accurate position measurement. For example, with a transmission frequency of approximately 2.4835 GHz, this will provide a position measurement accuracy of approximately 1 mm.

As shown in FIG. 24, the phase difference measurements calculated by the second phase measurement determination unit 74-2 are output to a second position determination unit 76-2. In this embodiment, the second position determination unit 76-2 calculates the position of the mobile tag 2" using the technique described in U.S. Pat. No. 3,889,264. Further, as shown in FIG. 24, the second position determination unit 76-2 also receives the position measurement determined by the first position determination unit 76-1. The second position determination unit 76-2 uses this received position measurement as an initial estimate of the position to resolve the phase ambiguity problem associated with the conventional phase-based position calculation technique.

In summary, therefore, in this eighth embodiment, the or each mobile tag 2" receives and measures the phase of all incoming tones and calculates:

i) the phase difference between different tones from the same transmitter 150; and ii) the phase difference between the same tones from different transmitters 150;

and uses these phase difference measurements together with the known position of the transmitters 150, to determine the position of the mobile tag 2".

Modifications

Although it has been described above to use the tracking system of the present invention to track horses in a horse race, the present invention is also applicable to dog racing, athletics, cycle racing and motor racing for example. The tracking system would be most useful in sports such as horse racing, athletics and dog racing as it is in these races that the small and unintrusive nature of the transmitter which the participant is required to wear or carry will be of greatest benefit.

In the above embodiments, three or four receivers were used to track the position of one or more mobile tags. As those skilled in the art will appreciate, this number of receivers was used in order to be able to calculate the absolute two-dimensional position of the tag relative to the receivers. However, if the position of the tag is constrained then fewer receivers may be used. For example, two receivers may be used in an embodiment similar to the first embodiment if the tag is constrained to move on one side of the receivers. Similarly, use of any additional receivers can be used to provide a position measurement in three dimensions (i.e. in height as well as in the x and y horizontal directions). As a further alternative, receivers may be deployed around the side of the track and controlled in such a manner that only a few of the receivers nearest to the tag are used at any one time. In such an embodiment, a "handover" process to introduce and remove receivers from the tag position calculation could be used. Such a handover process could take the form of an active system similar to those implemented in cellular telephone networks or as a simple system of estimating from the position and velocity which receivers will be closest and ignoring the data received from the more distant receivers. Whilst the position determining systems described above can operate with two or more receivers, they preferably use as many receivers as possible in order to provide redundancy in the position calculations.

In all of the embodiments described above, the receivers have been fixed and the transmitters have moved relative to the receivers. As those skilled in the art will appreciate, the receivers may also move provided their relative positions are known. However, such an embodiment is not preferred because of the complexity involved in maintaining knowledge of the positions of the different receivers.

In the above embodiments, each receiver received the signal transmitted from each tag and calculated phase measurements which it then passed to a central processing station. The central processing station then calculated phase difference measurements and used these phase difference measurements to calculate the position of the tag relative to the receivers. In an alternative embodiment, the phase difference calculations may be performed in the respective receivers. Such an embodiment is not preferred, however, since it increases the amount of processing that each receiver must perform.

In the above embodiments, each of the receivers received the signal transmitted by each of the tags and processed the received signal to determine phase measurements for the signal. As those skilled in the art will appreciate, it is not essential for these phase measurements to be carried out at the respective receivers. The processing may be carried out by the position processor or by some other intermediate calculating station. All that the receivers have to do is provide a "snapshot" of the signal that they receive. The remaining processing can be carried out elsewhere.

In the seventh and eighth embodiments described above, the mobile tag included all of the receiver and position processing circuitry of the fourth embodiment. As those skilled in the art will appreciate, the mobile tag of these embodiments may be modified to include the receiver circuitry of any of the other embodiments described above. Further, in these embodiments, the mobile tags may include the receiver circuitry and then may transmit the appropriate phase data to a remote position processor which calculates the position of the mobile tags. This information may then be transmitted back to the mobile tags if required.

In the eighth embodiment described above, the second position determining unit used the signals from four transmitters in order to overcome problems with lack of synchronisation between the transmitters and the mobile tag. Alternatively, the second position determining unit can use the phase measurements output from the fixed tag to calibrate out the problems associated with lack of synchronisation between the transmitters and the receiver. In this case, an additional network calibration unit could be used to modify the phase measurements output from the second phase measurement determining unit 74-2 shown in FIG. 24. The way in which this would be achieved will be familiar to those skilled in the art and will not be described further here.

In the eighth embodiment described above, the same phase measurements of transmitted tones were used in two different position calculations to determine the position of the mobile tag relative to the fixed transmitters. As those skilled in the art will appreciate, the transmitters may transmit completely independent tones at different frequencies for use by the two position processors. Such an independent system provides the advantage that the two subsystems may operate at different transmission frequencies. Therefore, if the propagation path between the transmitters and the mobile tag becomes blocked at one of the transmission frequencies, a position fix can still be obtained using the other position calculations which uses a different frequency band of operation.

In the eighth embodiment described above, the position calculation determined from the phase differences of the tones transmitted from the same transmitter were used as an initial estimate for the conventional phase-based position processor. As those skilled in the art will appreciate, it is possible to reverse this situation, with the position measurement derived from the conventional position processor being used as an initial estimate for the other position processor. For example, the conventional phase-based position processor may determine a coarse position measurement from transmitted tones having a long wavelength and use this as an initial estimate for the position processor which calculates the position using phase differences of tones transmitted by the same transmitter.

In the seventh and eighth embodiments, each of the transmitters transmitted a multitone signal. As those skilled in the art will appreciate, each of the tones could equally be a pseudo-noise coded signal or any other signal with defined and repeatable phase characteristics.

In the eighth embodiment described above, two position determination units were used with the position measurement obtained from one being used as an initial estimate for the position measurement determined by the other. As those skilled in the art will appreciate, if the two position determining units generate estimates of position which have approximately the same accuracy, then the two position measurements can be weighted and combined together to provide an enhanced accuracy position measurement. This can be achieved, for example, by using a 6.7 MHz tone to calculate the transmitter—transmitter phase differences and by using a 6.7 MHz tone and a 13.5 MHz tone to calculate common transmitter tone—tone phase differences, which will both give a position measurement over a range of 44 m with an accuracy of approximately 0.44 m. The weighting applied to the position measurements may be dependent on the frequency of use, the reliability of the measurement etc. Alternatively, the position measurements may be simply averaged together. The combination of the position measurements in this way will reduce multipath problems since each of the position measurements will be determined from signals that experience different multipath problems.

In all of the above embodiments, the transmitted signals have been radio frequency signals. As those skilled in the art will appreciate, other frequencies of electromagnetic waves (such as microwave or optical waves) could be used. Further, instead of electromagnetic waves, the transmitters may transmit acoustic signals, with the receivers using acousto-electrical transducers to detect the transmitted acoustic waves.

In the eighth embodiment described above, a second conventional phase-based position determination unit was combined with the positioning system described in the seventh embodiment. As those skilled in the art will appreciate, the techniques used in the eighth embodiment may be used in the analogous system in which the tags transmit signals to the fixed receivers. In this case, the position processor would calculate phase differences not only for the different signals received by the same receiver but also the phase differences for similar signals received at different receivers. Again, the way in which this would be done will be apparent to those skilled in the art and will not be described further here.

In the above embodiments, either the moving objects transmitted or received tones from a number of base stations. As those skilled in the art will appreciate, a practical system may use some mobile objects which are transmitters and some which are receivers. For example, in a football application, each of the football players may carry a mobile tag which operates to receive signals from transmitters arranged around the football pitch. The tags carried by each player may then calculate the player's position which it can then transmit to a remote computer system for use in generating simulation data or the like. In addition, the football may be adapted to carry a transmitter mobile tag, the signal from which may be received by the mobile tag carried by a number of the players. The player's tag would then calculate a phase measurement for the signal received from the football tag and transmit this back to the remote computer system. Using the phase measurements from different players, the remote computer system can then determine the position of the ball relative to those players, since it knows the position of each of the players. The remote computer system may also generate an initial estimate of the position of the ball from the known position of the players. This estimate of the position of the ball may then be used to resolve any phase ambiguity associated with the phase-based position measurement for the ball.

The above embodiments have described a system for determining the position of one or more mobile tags relative to a number of base stations. As those skilled in the art will appreciate, the system may be used both in an outdoor application and in an indoor application. The disadvantages of using the system in an indoor application is the increased noise caused by reflections (multipath) of the transmitted signals. As those skilled in the art will appreciate, there are various techniques for trying to overcome these multipath problems. These techniques may be used in any of the embodiments described above and include using multiple antennaes connected to the same receiver, using polarisation of the transmitted signals, using directional antennaes, using beam steering and/or null steering, using direct sequence spread spectrum signals and/or frequency hopping and using channel equalisation techniques. All of these techniques are known in the field of telecommunications and will not be described further here.

In the eighth embodiment described above, a conventional phase-based position determination unit was combined with the positioning system described in the seventh embodiment. The conventional phase-based position determination unit used the position processing techniques described in U.S. Pat. No. 3,889,264 to determine the position measurement. As those skilled in the art will appreciate, other conventional phase-based position determining units may be used such as the techniques described in U.S. Pat. No. 5,045,861, WO 97/11384 or any other conventional phase-based positioning system.

Figure 25:
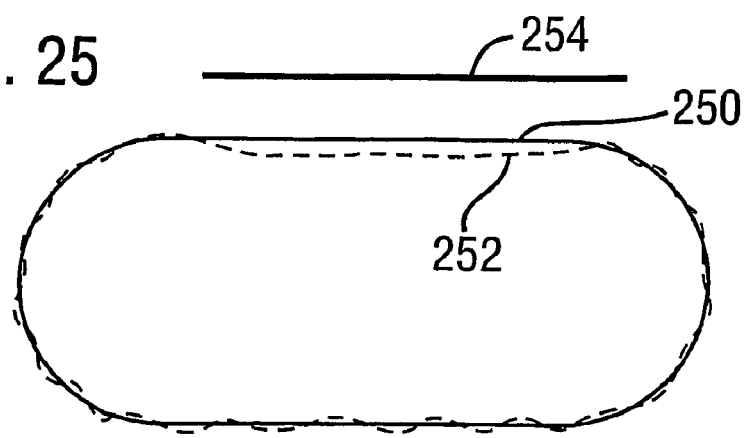
FIG. 25 is a schematic diagram illustrating an oval race-course and the effect on measured position of a metal fence at one side of the race-course.

In some of the above embodiments, a number of fixed tags were provided to overcome problems associated with the lack of synchronisation between the clocks in the mobile tags and the clocks in the base stations. As discussed in the first embodiment, these fixed tags are not essential if the clocks in the mobile tags and the base stations are synchronised. This synchronisation can be achieved in various ways, such as by the broadcasting of a synchronisation pulse either by one of the mobile tags or one of the base stations or by a separate third party transmitter. Nonetheless, even where synchronised base stations and mobile tags are used, the fixed tags may be used to calibrate the system for slowly varying position measurement errors caused by objects within the measurement area interfering with the transmitted signals. For example, FIG. 25 shows an oval 250 representing a race-course around which tracking of a mobile tag (not show) is to be carried out. The dashed line 252 represents the tracked position of the mobile tag without using any fixed tags for calibration purposes. The line 254 represents a metal fence which is provided at one side of the race-course 250. As can be seen from the dashed line 252, the metal fence 254 causes significant position errors in the position measurements because the transmitted signals reflect off the fence and create multipath errors in the position measurements. However, by providing a number of fixed tags at known locations around the oval 250, it is possible to measure the local errors between the measured position and the actual position and use these as calibration values to correct for the position measurement of the mobile tag being tracked.

For example, each of the fixed tags could be associated with a part of the track in its vicinity and calibration values measured and stored and associated with each fixed tag. Subsequently, when a mobile tag enters the vicinity of the fixed tag, the calibration values stored for the fixed tag will be combined (through appropriate matrix multiplication or addition) with the position measurement for the mobile tag in order to try to remove the errors caused by the static multipath (i.e. multipath errors that are not changing significantly with time). In this example, however, it is assumed that at any given time, the calibration data for one fixed tag will be used for calibrating the measured position of the mobile tag. Alternatively, the calibration values associated with a number of fixed tags may be weighted and combined together and then used to correct the measured position, with the weighting applied being dependent on how close the mobile tag is to each fixed tag. In addition to using the fixed tags to be able to provide calibration values for use in correcting the final position measurement, the fixed tags can also provide calibration data which can be applied directly to the phase measurements being calculated. As those skilled in the art will appreciate, these calibration corrections may be performed in real time during the tracking procedure or they can be performed later if the position information is not being displayed in real time. Further, as those skilled in the art will appreciate, the calculation of the calibration values may be repeated from time to time while tracking the mobile tag or it could be part of a setup procedure of the system, in which case the fixed tags could then be removed. However, the removal of the fixed tags will result in any changes in the errors not being corrected.

Where it has been described with reference to the specific embodiments to transmit the chirps within the frequency band from 2.4 GHz to 2.485 GHz, this should not be viewed as limiting, any transmission frequency can be used.

Although it has been described above with reference to the first embodiment to provide a range of 300 metres and with respect to the fourth embodiment to provide a range of 3,000 metres, these ranges should not be construed as limiting the present invention. The range of the tracking system may be determined by choosing appropriate frequency difference pairs to cover the desired measurement area.

While it has been described above with reference to the above embodiment that the FPGA 10 will provide data describing the start phase for each tone in a given chirp to the DDS 12, this is not essential. As an alternative, the DDS 12 may be able to calculate the start phase itself or to continue the generation of the signal and merely not to output it when it is not required and thus the start phase information would not be supplied by the FPGA 10 to the DDS 12.

In the above embodiments, the tones of each chirp were transmitted alternately. As those skilled in the art will appreciate, this is not essential. The tones may be transmitted simultaneously or in any sequence. However, the alternate pulsing of the tones used in the above embodiments allows simplification of the hardware in the transmitter and the receivers because it is never necessary to deal with more than one tone at any one time.

Although it has been described above with reference to the fourth embodiment to have a chirp structure as described with reference to FIG. 15, other chirp structures and relative frequencies of tones within the chirp may be used. For example, a chirp having the following seven tones with frequencies relative to a centre frequency of +0.1 MHz, 0 MHz, −10 MHz, +2.5 MHz, −9.5 MHz, 0 MHz and +0.5 MHz respectively may be used. Such a chirp structure would provide one measurement with a difference of 0.1 MHz, two measurements with a difference of 0.5 MHz, four measurements with a difference of 2.5 MHz and eight measurements with a difference of 10 MHz. This chirp structure provides a more gradual transition between different wavelengths than the chirp structure described with reference to the fourth embodiment. It also comprises more tones and a longer actual measurement period (assuming that the length of each tone within the chirp is unchanged) thereby providing a small improvement in signal to noise ratio (SNR). The use of 8 difference frequencies of around 10 MHz would provide an improved resolution over the fourth embodiment. Double the number of frequency differences and half the wavelength should yield a four times improvement. The use of two intermediate stages at 0.5 MHz and 2.5 MHz should improve the robustness of position acquisition by increasing position resolution thus reducing cycle count ambiguities. Also, the use of the 2.5 MHz difference will provide an intermediate fallback in the event that signal quality is too poor to use the 10 MHz difference signals.

Although it has been described above with reference to the fourth embodiment that each chirp contains a tone at a frequency $f_{ID}$ which frequency is unique for each tag, it would alternatively be possible to incorporate a data carrying tone into the chirp onto which data including the tag ID could be modulated using a conventional data modulation technique. This arrangement would also provide for additional data to be transmitted with each chirp, for example battery power or other operating conditions.

Although it has been described above with reference to the specific embodiments to use a duration of 0.3 ms for each positioning tone within a chirp, this is not restrictive and other durations are possible. Increasing the tone duration provides an increase in SNR for that tone, and if all tones are extended in duration such that the chirp has greater duration, then the chirp SNR will also be increased. Decreasing the tone duration provides a smaller collision probability when multiple tags are transmitting on the same frequencies as if each chirp is shorter in duration, then there is less chance of it colliding in time with another chirp.

Although it has been described above in the specific embodiments that the DDS generating the tones in the tags performs a simple switching operation between the tones, a more complex switching operation could be utilised. For example, where a "hard" ON-OFF switch is used between the tones this has the effect of broadening the spectrum as though it were an FSK system with extended side lobes on approximately 30 kHz spacing (assuming a 0.3 microsecond switching rate). In the case of a system where only a small number of tags are transmitting this is not a serious problem, however in a system where a large number of tags are transmitting this could cause significant interference between the chirps from different tags. It is therefore possible to shape each tone transmission. For example, Gaussian shaping may be used such that the amplitude of each tone will be Gaussian shaped across the duration of the tone. If a Gaussian filter with a bandwidth equivalent to one tone period with a Gaussian shaping factor of between 0.7 and 1.0 is used, the central 0.2 milliseconds of the 0.3 milliseconds tone has sufficient amplitude to be utilised for phase measurement, whilst achieving good suppression of spectral side lobes caused by tone switching. Such chirp shaping would not improve system accuracy significantly, however it would enable the use of a large number of tags. The shaping would also help to ensure that the transmitted spectrum is contained within the desired band thereby providing some SNR improvement. It would also help with compliance with IEEE 802.11 Regulations and reduce the likelihood of intermodulation distortion in the transmitter.

Where it has been described above with reference to the fourth embodiment to pass the sampled, mixed and decimated input data directly to a complex FFT, further processing (such as windowing the data) could be introduced to improve performance. For example, without windowing the data or overlapping the data the discrimination between FFT bins is not high and the system is less well suited for a situation where chirps from different tags are being received simultaneously in different frequency bins and good near-far performance needs to be attained. For example, it would be possible to implement a 14 MHz system reference clock, and a 14 bit ADC which gives up to 80 dB dynamic range, allowing for 54 dB of near-far separation allowing for a minimum of 26 dB SNR. This provides a 500:1 physical range under unobstructed line of sight conditions which, for example, could be implemented as a 6 metre to 3,000 metre range capability. This would produce a data stream into the signal processing block at 28 megasamples per second in I and Q having a bandwidth of 22.4 MHz. A 1024 point FFT operating on that data stream would give bin widths of approximately 27 kHz, since the chirp tones are arranged to rely on approximately 50 kHz spacing which is equal to twice the bin width it would be necessary to achieve a bin+1 attenuation of close to 80 dB. Even with careful data windowing this is difficult to achieve using an FFT. An alternative to the FFT is to use a direct implementation such as an FIR filter bank.

Although it has been described above with reference to the specific embodiments to use a fixed tag 5 located at a known location within the domain of the tracking system, it is possible to modify the location of the fixed tags such that each fixed tag is a single joint entity with a corresponding one of the receivers. This results in the positions of the fixed tags and the receivers becoming the same in the location mathematics but is also means that no separate fixed tags are required when deploying the system. This also means that there are as many fixed tags as there are receivers. However, with the fixed tags and the receivers each sharing the same clock, the calibration of the receiver network to a single network clock (that can be one, any or some average of the receiver clocks) is much simpler than the technique described above with reference to the second embodiment. This, therefore, reduces the computational load on the position processor since sets of position equations are now only received for each receiver and each measurement frequency and it is not necessary to multiply by the number of fixed tags. In addition, the use of a whole network of fixed tags gives a mesh of propagation paths crisscrossing the area of coverage with complete inter-linkage between receivers. Using the entire mesh of paths to obtain the network reference clock will improve system performance.

Although it has been described above with reference to the specific embodiments that the link between the receivers and the position processor is established using a wireless TCP/IP network, that case is not limiting and any suitable cabled or wireless network using any suitable network protocol may be used to establish the receiver to position processor links.

Although it has been described above with reference to the first to fifth embodiments to use an FPGA and DDS, and with reference to the sixth embodiment to use a signal generator, to generate the tone signals within the tags, any method of generating the tones in a stable phase-continuous manner may be used. An example of an alternative method would be to use a crystal oscillator at each of the required frequencies to generate the tones.

In the above embodiments, the or each transmitter transmitted a multi-tone signal in which the frequency spacing between the tones was known in advance. As those skilled in the art will appreciate, this is not essential. The results of the FFT analysis performed in the receivers can identify the frequencies of the transmitted tones and hence identify the spacing therebetween. Similarly, in the frequency hopping embodiment described above, the frequency hopping schedule does not need to be known in advance and can be determined directly from the FFT results from each of the receivers.

Although the embodiments described above have used computer apparatus and processes performed in computer apparatus, the invention also extends to computer programs, particularly computer programs on or in a carrier, adapted for putting the invention into practice. The program may be in the form of source code, object code, a code intermediate source and object code such as any partially-compiled form, or in any other form suitable for use in the implementation of the processes according to the invention. The carrier may be any entity or device capable of carrying the program. For example, the carrier may comprise a storage medium, such as a ROM, for example a CD-ROM or a semi-conductor ROM, or a magnetic recording medium, for example a floppy disc or hard disc. Further, the carrier may be a transmissible carrier such as an electrical or optical signal which may be conveyed via electrical or optical cable or by radio or other means.

The invention claimed is:

1. A position determining system comprising:
   a first member and a plurality of second members, the first and second members being movable relative to each other and the position of each of the second members relative to the other second members being known;
   wherein the first and second members are arranged so that upon the transmission of a signal comprising first and second different frequency components between the first member and the plurality of second members, there is generated a plurality of received signals each associated with a respective transmission path between a respective second member and the first member;
   a signal processor operable to process each received signal to determine a corresponding phase measurement for the first frequency component thereof and a corresponding phase measurement for the second frequency component thereof;
   a first phase differencing calculator operable to calculate, for each received signal, a phase difference between the phase measurements of the first and second frequency components of the received signal, to generate a first set of phase difference measurements;
   a first position determiner operable to determine a first position measurement of the relative position of the first member and the plurality of second members from the first set of phase difference measurements and the known relative positions of the second members;
   a second phase differencing calculator operable to calculate phase difference measurements between phase measurements of frequency components of different received signals, to generate a second set of phase difference measurements;
   a second position determiner operable to determine a second position measurement of the relative position between the first member and the plurality of second members from the second set of phase difference measurements and the known relative positions of the second members; and
   a third position determiner operable to determine the relative position between the first member and the plurality of second members using the first and second position measurements.

2. A system according to claim 1, wherein said third position determiner forms part of said second position determiner, wherein said second position measurement includes a phase ambiguity and wherein said third position determiner is operable to use the first position measurement to resolve the phase ambiguity associated with the second position measurement to determine the relative position between the first member and the plurality of second members.

3. A position determining system according to claim 1, wherein said third position determiner is operable to determine the relative position between the first member and the plurality of second members by performing a weighted combination of the first and second position measurements.

4. A system according to claim 1, wherein said third position determiner is operable to determine the relative position between the first member and the plurality of second members by averaging the first and second position measurements.

5. A system according to claim 1, wherein said third position determiner forms part of said first position determiner, wherein said first position measurement includes a phase ambiguity and wherein said third position determiner is operable to use the second position measurement to resolve the phase ambiguity associated with the first position measurement to determine the relative position between the first member and the plurality of second members.

6. A system according to claim 1, wherein said first position determiner is operable to perform an iterative processing routine to determine said first position measurement using said first set of phase difference measurements.

7. A system according to claim 1, wherein said second position determiner is operable to perform an iterative processing routine to determine said second position measurement using said second set of phase difference measurements.

8. A system according to claim 1, wherein said first member comprises a transmitter for transmitting said signal and wherein said plurality of second members each comprise a receiver for receiving the transmitted signal and for generating a respective one of said received signals.

9. A system according to claim 1, wherein each of said plurality of second members comprises a transmitter for transmitting said signal and wherein said first member comprises a receiver for receiving the signal transmitted by each of the second members to generate said received signals.

10. A system according to claim 1, comprising a plurality of first members,
  wherein the plurality of first and second members are arranged so that upon the transmission of a signal comprising first and second different frequency components between each first member and the plurality of second members, there is generated a plurality of sets of received signals, each set being associated with a respective one of the first members and the received signals in each set being associated with the respective transmission path between a respective second member and the associated first member;
  wherein said first phase differencing calculator is operable to calculate a first set of phase difference measurements associated with each first member;
  wherein said first position determiner is operable to determine a first position measurement of the relative position of each first member and the plurality of second members from the first set of phase difference measurements associated with the first member and the known relative positions of the second member;
  wherein said second phase differencing calculator is operable to calculate a second set of phase difference measurements for each first member;
  wherein said second position determiner is operable to determine a second position measurement of the relative position between each first member and the plurality of second members from the second set of phase difference measurements for the first member and the known relative positions of the second members; and
  wherein said third position determiner is operable to determine the relative position between each first member and the plurality of second members using the corresponding first and second position measurements.

11. The system of claim 8, wherein a separate signal processor is provided for each receiver which is located at the corresponding receiver and which is operable to determine the phase measurements for the signal received at the corresponding receiver.

12. The system of claim 11, wherein said position determiner and said phase differencing calculators are located within a central processing station, and wherein said signal processors are operable to transmit said phase measurements to said central processing station.

13. The system of claim 8, wherein the transmitter is operable to transmit pulses of said signal, wherein said signal processor is operable to determine a phase measurement for the first and second frequency components during each pulse of said transmitted signal, wherein said phase differencing calculators are operable to calculate a phase difference measurements for each received signal during each pulse and wherein said first position determiner is operable to determine a position of the transmitter at the time of each pulse on the basis of the calculated phase difference measurements for the received signals for the corresponding pulse and the known relative positions of the receivers.

14. The system of claim 13, wherein said signal processor is operable to determine the phase of each frequency component at each of a plurality of different times during each pulse and wherein said determined phase measurement for each frequency component comprises a phase offset value corresponding to the phase of the respective component at one of said times and a phase slope measurement indicative of the rate at which the determined phase of said frequency component changes during each pulse.

15. The system of claim 14, wherein said first phase differencing calculator is operable to calculate a phase difference measurement for both said phase offset measurement and said phase slope measurement.

16. The system of claim 8, wherein said receivers are unsynchronised and further comprising a reference transmitter whose position relative to said receivers is known and operable to transmit a reference signal having first and second frequency components with a frequency spacing therebetween, wherein said plurality of receivers are operable to receive the reference signal transmitted from the reference transmitter, wherein said signal processor is operable to process the reference signal received at each receiver to determine for each received reference signal, a phase measurement for the first frequency component and a phase measurement for the second frequency component, wherein said first phase differencing calculator is operable to calculate a phase difference measurement for each received reference signal from the determined phase measurements for the corresponding received reference signal and further comprising:
  a calibration value calculator operable to calculate a respective calibration value for each receiver from the calculated phase difference measurements for the received reference signals, the known relative positions of the receivers and the known relative position of the reference transmitter; and
  a calibrator operable to adjust said phase measurements using said calibration values to account for the lack of synchronisation of said receivers.

17. The system of claim 8, wherein said transmitter is a transmit-only transmitter and operates asynchronously with respect to said receivers.

18. The system of any of claim 8, wherein said position determiners are operable to determine a two-dimensional position of said transmitter.

19. A position processor for determining the relative position between a first member and a plurality of second members, the first and second members being movable relative to each other and the position of each of the second members relative to the other second members being known and the first and second members being arranged so that upon the transmission of a signal comprising first and second different frequency components between the first member and the plurality of second members, there is generated a plurality of received signals each associated with a respective transmission path between a respective second member and the first member, the position processor comprising:
  a first phase differencing calculator operable to calculate, for each received signal, a phase difference between a phase measurement of the first and second frequency components of the received signal, to generate a first set of phase difference measurements;
  a first position determiner operable to determine a first position measurement of the relative position of the first member and the plurality of second members from the first set of phase difference measurements and the known relative positions of the second members;
  a second phase differencing calculator operable to calculate phase difference measurements between phase measurements of frequency components of different received signals, to generate a second set of phase difference measurements;

a second position determiner operable to determine a second position measurement of the relative position between the first member and the plurality of second members from the second set of phase difference measurements and the known relative positions of the second members; and a third position determiner operable to determine the relative position between the first member and the plurality of second members using the first and second position measurements.

20. A position according to claim 19, further comprising a signal processor operable to process each received signal to determine a corresponding phase measurement for the first frequency component thereof and a corresponding phase measurement for the second frequency component thereof.

21. A receiver for receiving a plurality of signals transmitted from a plurality of transmitters located at different locations, each transmitter being operable to transmit a signal having first and second different frequency components, the receiver comprising:

a signal receiver operable to receive the signal transmitted by each transmitter;

a signal processor operable to process each received signal to determine a corresponding phase measurement for the first frequency component thereof and a corresponding phase measurement for the second frequency component thereof;

a first phase differencing calculator operable to calculate, for each received signal, a phase difference between the phase measurements of the first and second frequency components of the received signal, to generate a first set of phase difference measurements;

a second phase differencing calculator operable to calculate phase difference measurements between phase measurements of frequency components of different received signals, to generate a second set of phase difference measurements; and an output operable to output said first and second set of phase difference measurements for transmission to a central position processor.

22. A position determining method for determining the relative position between a first member and a plurality of second members, with the first and second members being movable relative to each other and with the position of each of the second members relative to other second members being known; the method comprising:

transmitting a signal comprising first and second different frequency components between the first member and the plurality of second members;

receiving a plurality of signals, each associated with a respective transmission path between a respective second member and the first member;

processing each received signal to determine a corresponding phase measurement for the first frequency component thereof and a corresponding phase measurement for the second frequency component thereof;

calculating, for each received signal, a phase difference between the phase measurements of the first and second frequency components of the received signal, to generate a first set of phase difference measurements;

determining a first position measurement of the relative position of the first member and the plurality of second members from the first set of phase difference measurements and the known relative positions of the second members;

calculating phase difference measurements between phase measurements of frequency components of different received signals, to generate a second set of phase difference measurements;

determining a second position measurement of the relative position between the first member and the plurality of second members from the second set of phase difference measurements and the known relative positions of the second members; and determining the relative position between the first member and the plurality of second members using the first and second position measurements.

23. A computer readable medium storing computer executable instructions for causing a programmable computer device to determine the relative position between a first member and a plurality of second members, the first and second members being movable relative to each other and the position of each of the second members relative to the other second members being known and the first and second members being arranged so that upon the transmission of a signal comprising first and second different frequency components between the first member and the plurality of second members, there is generated a plurality of received signals each associated with a respective transmission path between a respective second member an the first member, the computer executable instructions comprising:

instructions for calculating, for each received signal, a phase difference between a phase measurement of the first and second frequency components of the received signal, to generate a first set of phase difference measurements;

instructions for determining a first position measurement of the relative position of the first member and the plurality of second members from the first set of phase difference measurements and the known relative positions of the second member;

instructions for calculating phase difference measurements between phase measurements of frequency components of different received signals, to generate a second set of phase difference measurements;

instructions for determining a second position measurement of the relative position between the first member and the plurality of second members from the second set of phase difference measurements and the known relative positions of the second member; and instructions for determining the relative position between the first member and the plurality of second members using the first and second position measurements.

* * * * *

UNITED STATES PATENT AND TRADEMARK OFFICE
CERTIFICATE OF CORRECTION

PATENT NO. : 7,024,331 B2  Page 1 of 1
APPLICATION NO. : 10/777127
DATED : April 4, 2006
INVENTOR(S) : Aled Wynne Jones et al.

It is certified that error appears in the above-identified patent and that said Letters Patent is hereby corrected as shown below:

Column 39,
Line 43, "claim 8 ," should read -- claim 8, --.
Line 58, "calculate a phase" should read -- calculate phase --.

Column 40,
Line 40, "system of any of claim" should read -- system of claim --.

Column 42,
Line 34, "an" should read -- and --.

Signed and Sealed this

Eleventh Day of July, 2006

JON W. DUDAS
*Director of the United States Patent and Trademark Office*